Figure 1:
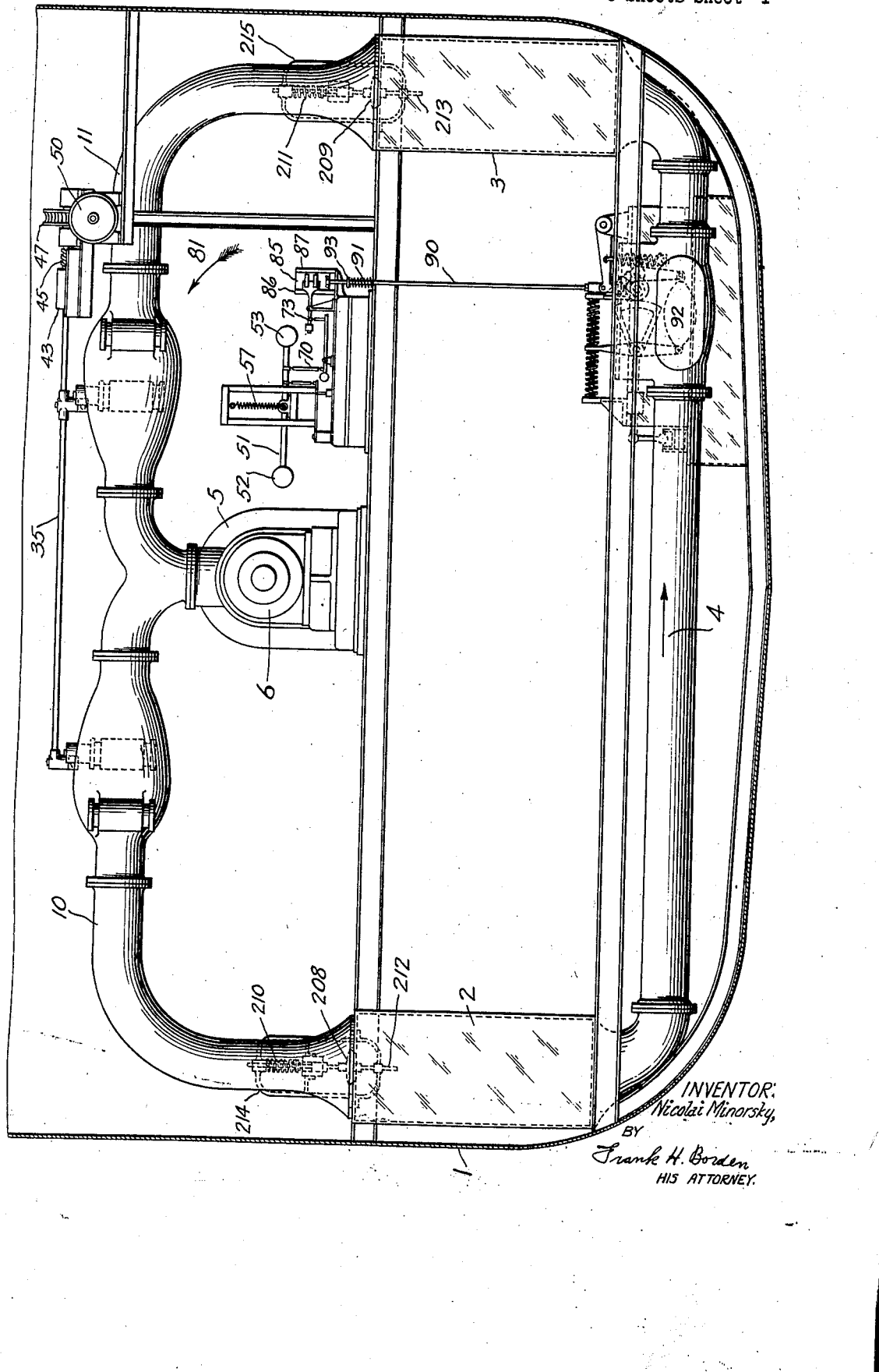

Oct. 15, 1935.   N. MINORSKY   2,017,072
STABILIZING APPARATUS
Filed April 11, 1932   6 Sheets-Sheet 3
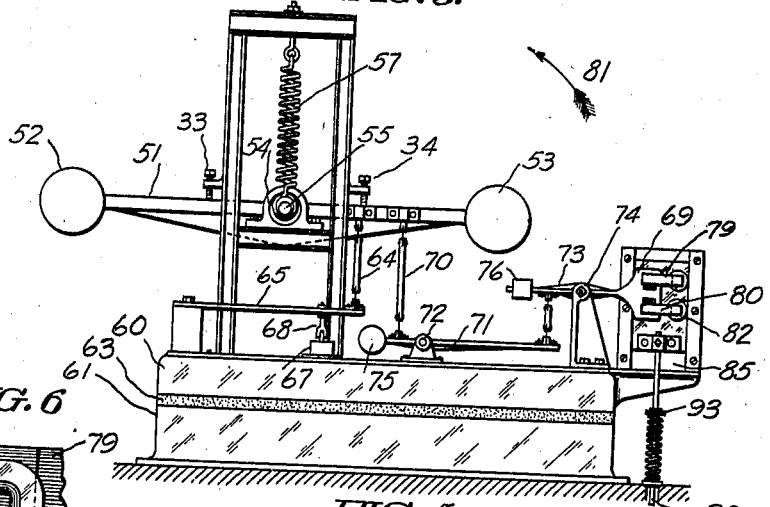
FIG. 3.
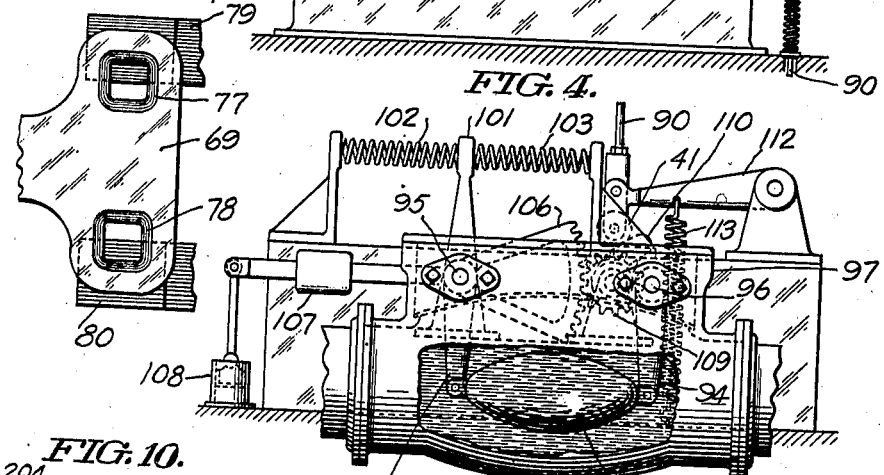
FIG. 6.
FIG. 4.
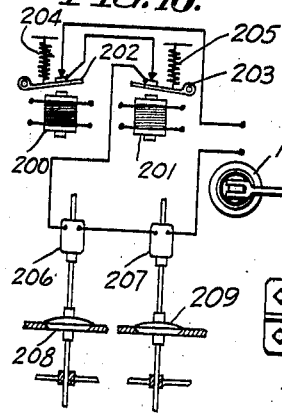
FIG. 10.
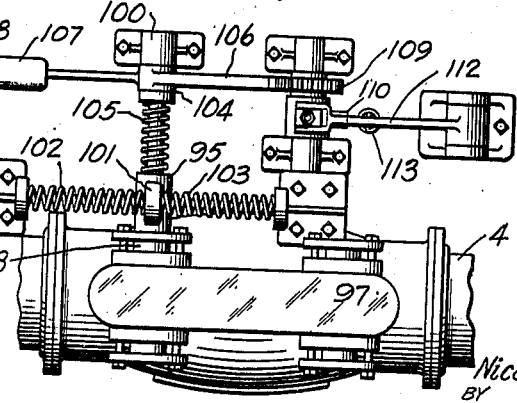
FIG. 5.
INVENTOR
Nicolai Minorsky,
BY
Frank H. Borden
HIS ATTORNEY.

Oct. 15, 1935.  N. MINORSKY  2,017,072
STABILIZING APPARATUS
Filed April 11, 1932  6 Sheets-Sheet 4
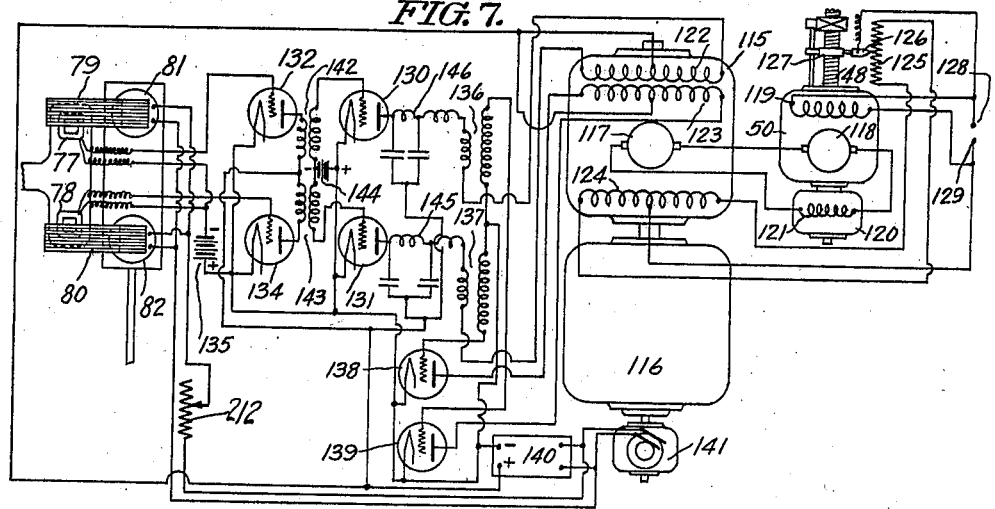
FIG. 7.
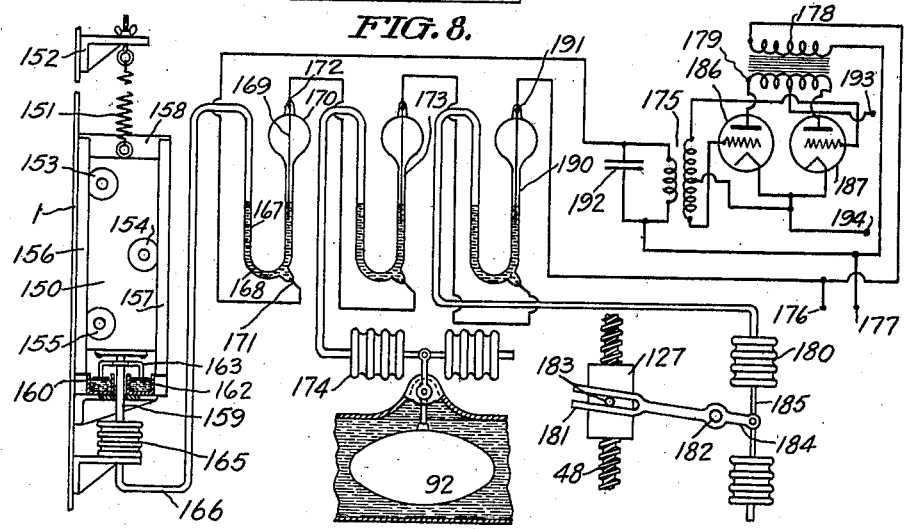
FIG. 8.
FIG. 9.
INVENTOR:
NICOLAI MINORSKY,
By Frank H. Borden
HIS ATTORNEY Oct. 15, 1935. N. MINORSKY 2,017,072
STABILIZING APPARATUS
Filed April 11, 1932 6 Sheets-Sheet 5
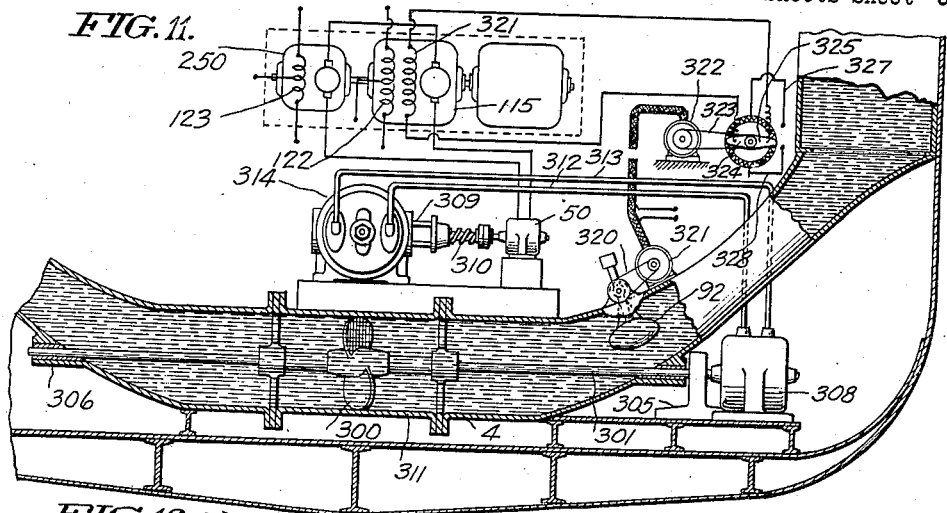
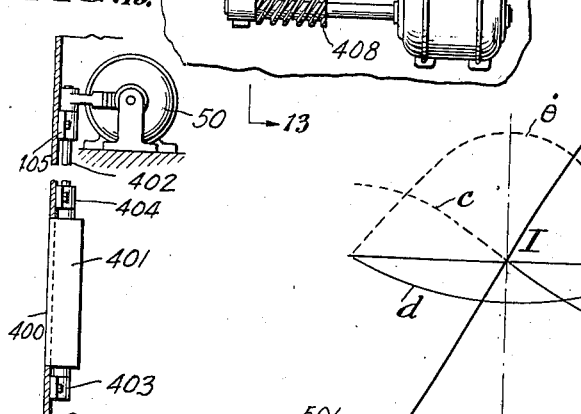
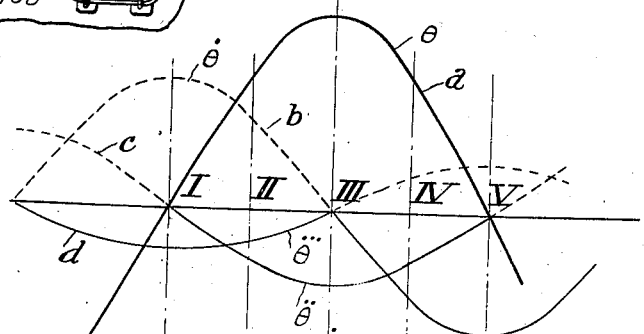
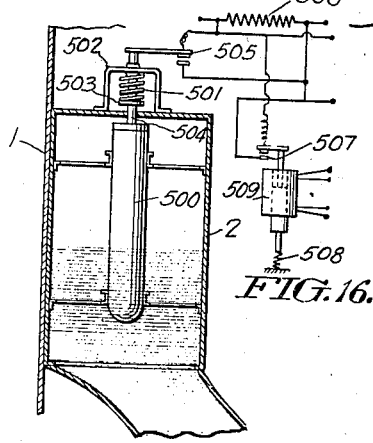
INVENTOR:
Nicolai Minorsky,
BY
Frank H. Borden
HIS ATTORNEY.

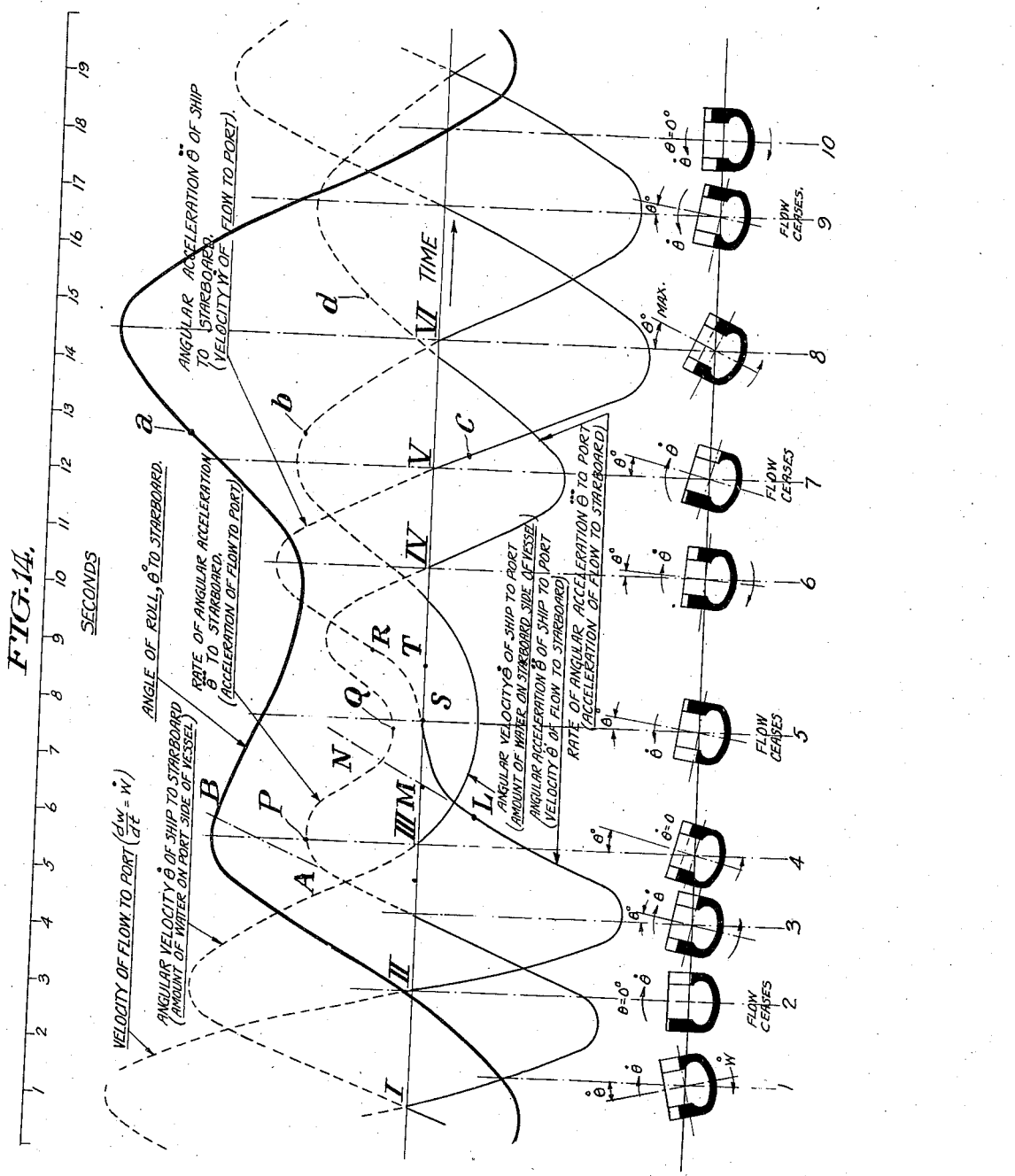

Patented Oct. 15, 1935

2,017,072

UNITED STATES PATENT OFFICE 2,017,072

STABILIZING APPARATUS

Nicolai Minorsky, Swarthmore, Pa.

Application April 11, 1932, Serial No. 604,385

40 Claims. (Cl. 114—125)

This invention relates to improvements in apparatus for anti-rolling stabilization of ships, airships, submarines and other moving vehicles hereinafter broadly designated as "ships" or "vessels", by means of displacement of liquid ballast between a pair, or sets of pairs, of tanks placed on both sides of the vessel. The liquid ballast referred to may be water, oil, mercury, or any other fluid which for convenience hereafter will be designated broadly as "water" or "liquid".

More specifically the invention relates to improvements in the so called active method of anti-rolling stabilization, in which the displacements of the liquid ballast are controlled by externally applied forces or pressures, such as air pressure from a blower or compressor driven by an auxiliary source of power, or in the case of heavy liquids such as mercury, by hydraulic systems such as rams actuated by oil or the like, or other means for effecting the transfer of water, as later described.

It is known that such active method or principle applied to control the displacements of the ballast distinguishes from the earlier so called passive methods in which the displacements of water were produced by the angular motion of the ship without any actuation on the part of an external source of power.

The movement of water in such passive tank system is substantially in time quadrature with respect to the motion of the ship when the rolling is produced by substantially regular trochoidal waves. The roll quenching efficiency of an anti-rolling system of this kind under the above specified conditions is comparatively good especially when the tank system has its own period sufficiently near to the point of synchronism of the ship and of the waves whereby the dynamical head necessary for the acceleration of water between the tanks can be continuously supplied by the potential head available from the fact that the ship is rolling and that, for this very reason, instantaneously one tank is higher than the other.

It is apparent that the performance of the passive tank stabilizer depends essentially on the fact that the ship is rolling over substantial angles at which the potential head is sufficient for the acceleration of water athwartships in the proper time and to the required extent. For this reason anti-rolling tank passive systems never quench the rolling to a substantially negligible degree but merely damp out or reduce the excessive roll to somewhat smaller amplitudes.

Furthermore the roll quenching efficiency of the passive tank system decreases still further when the rolling ceases to be regular and when consequently the above mentioned mutual compensation of potential and dynamical heads is no longer possible; in some cases owing to complicated conditions of phase reversal occurring in a confused irregular sea the passive tank system as is observed, may even enhance the rolling instead of quenching it.

The disturbing moment applied to the ship from the waves generally speaking is never regular. Subsequent waves differ from each other both in length, period and shape, and for this reason, the rolling is never a periodic or recurrent phenomenon.

Complicated conditions of phase reversal above referred to are frequently observed which leads either to development of "flat spots" in the rolling curve or to angular accelerations of the ship considerably in excess of those which would otherwise occur if the rolling were regular, corresponding to a substantially trochoidal profile of the waves.

The existing tendency both in naval and merchant ship design is to build vessels with a considerable metacentric height in order to secure a greater inherent safety of ships. Such ships, however, are generally bad rollers insofar as their roll has not only a considerable magnitude but generally is very irregular thus reflecting similar irregularity of the waves encountered.

Vessels having a comparatively small metacentric height are not safe at sea especially when in a damaged condition, but they generally roll more in their own period and are not influenced by the irregularities of the sea to the same extent as the vessels with a great metacentric height.

In view of these facts the anti-rolling tank system on modern vessels must be adapted to operate essentially under the conditions of irregular rolling which is generally encountered at sea, whereas the regular rolling is rather a rare exception.

It is the fundamental object of this invention to provide a new method and means for an efficient control of displacements of water between stabilizing or anti-rolling tanks either actually by transfer or effectively without direct transfer, as will be explained, in such manner as to provide the maximum roll quenching in all cases, that is, both for the regular and irregular rolling, and to render the tank system considerably more efficient to the extent of securing substantially "dead beat" stabilization.

Stabilization according to this system, is accomplished by placing a fluid weight, under all conditions, on the rising side of the ship and by having the magnitude of the weight substantially proportional to angular velocity of rolling, whereby the energy of the wave slope which otherwise would be utilized in enhancement of the roll, is largely absorbed by raising the extra weight. From a more quantitative standpoint the same broad idea can be also stated as follows:

The rolling of vessels among waves, as is known, is expressed approximately by the following differential equation due to Wm. Froude.

$$I\frac{d^2\Theta}{dt^2}+K_1\frac{d\Theta}{dt}+K_2\left(\frac{d\Theta}{dt}\right)^2+Wh\Theta=Wh\phi\sin\frac{2\pi}{T_1}t \quad (1)$$

Where I is the effective moment of inertia of the ship about the longitudinal axis of symmetry passing through the center of gravity, $K_1$ and $K_2$ are coefficients of resistance to rolling, W is the displacement, h is the metacentric height, $\phi$ is the maximum effective wave slope, $T_1$ is the apparent period of the waves, $\Theta$ is the instantaneous angle of rolling.

In this equation the left member characterizes the ship and the right one the action of the waves. If this latter is erratic, clearly the harmonic second member cannot be used to represent such erratic condition.

As a starting point for this exposition I adopt a method of control in which the instantaneous excess $w$ of the liquid ballast on one side of the vessel and hence the instantaneous value of the stabilizing moment $M_t$ exerted by the tanks on the ship about its longitudinal axis, is made substantially proportional to the instantaneous angular velocity $$\frac{d\Theta}{dt}$$

of rolling, so that at any moment there exists an instantaneous relation $$M_t=K'\frac{d\Theta}{dt} \quad (2')$$

where $K'$ is another coefficient of proportionality which can be made considerably greater than the coefficient $K_1$ of natural so called "wave making resistance to rolling", due to the form of the hull, bilge keels and the like.

The differential Equation (1) in this case acquires a new coefficient of the term with $$\frac{d\Theta}{dt}$$

namely, $K=K_1+K'$ much greater than the original $K_1$ and it can be shown by analysis that the damping action of such control will be considerably enhanced, which will favorably affect the wiping out of the free oscillation of the ship from time to time arising in the seaway, as well as to reduce the effect of the external disturbances due to waves, whether regular or erratic. In view of the fact that the new coefficient K is considerably greater than the original $K_1$, the second coefficient $K_2$ can be neglected in Equation (1) applied to the stabilizer of this kind. It is apparent, that viewed from this angle, everything will happen in a manner as if the vessel, while being subjected to exactly the same sequence of disturbing actions and of exactly the same magnitude, were placed instead of in water, in a highly viscous or damping substance such as thick molasses, heavy lubricating gear grease, and the like. One conceives readily that all actions coming from the waves, whether regular or erratic would be equally damped out and would have no appreciable effect in producing rolling.

If the variation of gravity on the waves, generally small for modern vessels, is neglected, the moment $M_t$ is proportional to the excess $w$ of water instantaneously situated on the rising side of the vessel. The preceding condition (2') in this case is equivalent to the following:

$$w=-a\frac{d\Theta}{dt} \quad (2)$$

that is the instantaneous excess $w$ of water at all times must be in time phase with angular velocity $$\frac{d\Theta}{dt}$$

of rolling and must be situated on the rising side of the ship. The factor of proportionality or coupling $a$ is established by the design and in general must be subject to variation in order to adjust its value to each individual case.

If the preceding theoretical condition (2) of damping is differentiated one has:

$$\frac{dw}{dt}=\dot{w}=-a\frac{d^2\Theta}{dt^2} \quad (3)$$

and differentiating it again:

$$\frac{d^2w}{dt^2}=\ddot{w}=-a\frac{d^3\Theta}{dt^3} \quad (4)$$

Equations (3) and (4) follow directly from (2) and conversely Equation (3) can be obtained by integrating (4) with respect to the time and Equation (2) is also obtained by integrating (3) with respect to the time and determining in both cases the constants of integration by suitable initial conditions. Equation (2) determines directly the law of variation of the liquid weight which accounts for roll quenching. It is difficult, however, to produce an equipment capable of concentrating considerable masses of water in proportion to the instantaneous angular velocity of the ship especially when the rolling is irregular in view of the inertia of the liquid, and also on account of the time lags in the controlling system.

It is more practical to produce the instantaneous rate of transfer $$\frac{dw}{dt}$$

of the ballast which in the course of time, that is after being integrated with respect to time, produces the displacements of water in accordance with Equation (2). It is apparent from Equation (3) that if the rate of transfer is made proportional to the angular acceleration $$\frac{d^2\Theta}{dt^2}$$

of rolling, the theoretical condition (2) is fulfilled eo ipso, since the time integral of (3) gives always (2), quite irrespective of the fact whether the rolling is regular (or harmonic) or entirely irregular. On this principle as a base this invention utilizes means for regulation of the rate of transfer of the ballast substantially in proportion to, or as a function of, the instantaneous angular acceleration of the ship both in direction and in magnitude. For illustrative purposes the rate of transfer is made substantially proportional to the angular acceleration in the following description.

In view of the fact that the angular acceleration $$\frac{d^2\theta}{dt^2}$$

of the ship is in phase with the disturbing moment of the waves applied to the ship about the longitudinal axis of the latter, clearly Equation (3) describes also such method of control in which the rate of transfer of the liquid is controlled substantially in proportion to the value of this moment both in direction and magnitude; the control of this kind for this reason responds to, or compensates for the very disturbing cause producing the rolling instead of reacting upon the actual rolling, which is the effect of the disturbing moment above referred to.

Conversely, if the timing of the transfer takes place in accordance with Equation (3) the integrated value of this transfer, that is the moment exerted by the tanks owing to the excess of water in one of them, is in phase with the instantaneous angular velocity of rolling as is necessary for efficient roll quenching. The problem, therefore, consists in establishing a predetermined, preferably linear, relation between the angular acceleration of the vessel and the rate of transfer of the liquid, whether such transfer is direct or only effective.

To this end I provide an instrument continuously responsive to angular acceleration of the ship, which by means of an electrical circuit, or circuits having also continuous characteristics, modifies the conditions of operation of the power plant displacing the liquid in such manner that the rate of transfer of water is continuously maintained substantially in proportion to the instantaneous angular acceleration of the vessel, both in direction and magnitude. This "following up" of the angular acceleration on the part of the rate of transfer in practice takes place inevitably with a certain time lag due partially to the inertia of water and partially to inherent time lags in the various instruments, circuits and apparatus.

To obviate this I provide an additional controlling circuit responsive to the rate of angular acceleration or, which is equivalent, to the third time derivative $$\frac{d^3\theta}{dt^3}$$

of the angular motion of rolling. The physical significance of the third time derivative is the rate of change of the resultant torque applied to the ship from the waves.

When, therefore, the angular acceleration varies, the corrective control by the third time derivative compensates for the time lags and produces an anticipatory action whereby the rate of flow $$\frac{dw}{dt}$$

is varied substantially in accordance with Equation (3) and hence the excess amount (or weight) $w$ of water concentrated instantaneously on the rising side of the vessel by this very fact is varied in accordance with Equation (2) as is required for an efficient roll quenching.

Equation (4) indicates also that the acceleration of flow $$\frac{d^2w}{dt^2}$$

must be proportional to the third derivative of rolling. In order to accelerate the water flowing between the tanks a certain additional "accelerational" head is required, hence the Equation (4) indicates that this additional head must be controlled in response to the rate at which the external torque of the waves varies at each particular instant.

Conversely if the accelerational head accelerating the flow of water athwartships between the tanks is varied in accordance with Equation (4) the control of the rate of flow in accordance with Equation (3) can be produced with a considerable degree of accuracy insofar as the major part of the time lag due to the inertia of water is compensated in this manner.

The preceding considerations are altogether general and applicable to the regular as well as to the irregular or erratic disturbances.

I have shown in my co-pending U. S. patent application Ser. No. 544,651 that in the most general case the stabilizing moment necessary for the compensation of any kind of disturbing action coming either from waves or wind should contain theoretically a plurality of higher time derivatives, so that in the instant case when the excess of water $w$, considered as a function of time, is controlled by the instruments, the most general relation is of the form:

$$W(t_0+\Delta t)=W(t_0)+\Delta t\left(\frac{dw}{dt}\right)_{t_0}+\frac{\Delta t^2}{2}\left(\frac{d^2w}{dt^2}\right)_{t_0}+\frac{\Delta t^3}{6}\left(\frac{d^3w}{dt^3}\right)_{t_0} \quad (5)$$

whereby the correct amount of the water at a given instant of time $t_0+\Delta t$ can be concentrated on the rising side of the ship if the amount of this excess $w(t_0)$ as well as the values of the subsequent time derivatives at the preceding instants $(t_0)$ is instrumental in producing the controlling action, as this is apparent from Equation (5) representing Taylor's expansion.

Each subsequent higher time derivative of motion responsive instrument or controlling apparatus corrects the resultant action of the plurality of the preceding ones and improves the timing of stabilizing moment whereby for the same amount of water in the tanks a greater roll quenching action is produced.

In the present invention the rate of transfer $$\frac{dw}{dt}$$

of water is made proportional to the angular acceleration, the acceleration $$\frac{d^2w}{dt^2}$$

of the transfer is made proportional to the rate of angular acceleration $$\frac{d^3\theta}{dt^3}$$

and in view of what has been explained the excess of water $w$ instantaneously concentrated in the rising tank remains substantially proportional to the angular velocity of rolling.

$$\left(\frac{d\theta}{dt}\right)_{t_0+\Delta t}=\left(\frac{d\theta}{dt}\right)_{t_0}+\Delta t\left(\frac{d^2\theta}{dt^2}\right)_{t_0}+\frac{\Delta t^2}{2}\left(\frac{d^3\theta}{dt^3}\right)_{t_0} \quad (6)$$

Equation (6) shows that the value of angular velocity $$\frac{d\theta}{dt}$$

can be correctly computed at a subsequent instant $t_0+\Delta t$ which can be designated conventionally as the "present instant" if the value of angular velocity at the preceding instant $t_0$, which may be called also conventionally "the past instant" is supplemented by the plurality of high time derivatives $$\frac{d^2\Theta}{dt^2}, \frac{d^3\Theta}{dt^3}$$

all relative to the past instants.

The controlling actions emanating from the instruments relate inevitably to the past instants in view of the time lags, and relations (5) and (6) being interdependent show that the presence of high time derivatives permits of eliminating the effect of time lags and produces a dynamically correct concentration of the water ballast at the instant $t_0+\Delta t$ if its concentration was correct, that is fulfilling Equation (2), at the preceding instant $t_0$. Equations (5) and (6) are altogether general, applicable to all kinds of functions whether harmonic, periodic or entirely irregular, as long as they are continuous and admitting derivatives which is always the case in dynamics. In other words, once the ballast has started quenching in accordance with Equation (2) it will never get out of step with the disturbance, whether regular or irregular. These broad dynamical considerations will be more apparent from the latter analysis of performance of the stabilizing system forming the subject of this invention when quenching an irregular rolling.

In order to produce the control of the ballast of this kind the instruments and the circuits according to this invention control the rate of flow substantially in proportion to the value of angular acceleration of the ship and the acceleration of this flow substantially in proportion to the rate of acceleration of the ship. The excess of the ballast concentrated instantaneously on the rising side of the vessel is then obtained by the process of integration with respect to time without any additional instruments. As in all processes of integration a cumulative error is possible; in the present instance this error would manifest itself in a slow drift of the liquid ballast to one side of the ship whereby the stabilization would occur, instead of about the true upright or vertical position, about a slightly inclined position in space. It is true that the inherent stability of the vessel will tend to eliminate this slow drift of the liquid ballast to one side. I prefer, however, to provide an additional controlling means responsive either to a slow average departure of the ship from verticality or to a point of relative quiescence of the ship among waves which equalizes continuously in the first case and instantaneously and discontinuously in the second case this cumulative error or drift whereby the stabilizing efficiency of the dynamical control operating in accordance with Equations (2), (3) and (4) remains undisturbed.

When the equipment is started among the waves either from rest or from the passive performance I prefer to introduce the active stabilization gradually by varying the coupling coefficient $a$ by suitable variation of parameters of controlling circuits whereby the liquid ballast is accelerated with gradually increasing amplitudes. In cases when the rolling is excessive and the Equations (2), (3) and (4) cannot be fulfilled the invention provides automatic discriminating means responsive to the excess of rolling and decreasing the intensity of the coupling coefficient so as to avoid violent surges or rushes of water between the tanks, assuming, of course, that the power capacity of the prime moves is very high.

Broadly stated the invention consists in the provision of a method and means for producing the rate of variation of the stabilizing moment due to the tanks in a predetermined functional relation to the angular motion of rolling, whereby under all circumstances the basic condition of optimum roll quenching given by Equation (2) is continuously fulfilled. In the case in which the tanks are connected by a channel or pipe the above mentioned control of the rate of variation of the stabilizing moment is identified with the control of the flow of water through this channel in a predetermined functional relation to the angular motion of rolling. Of particular importance is the application of this broad principle to the case of irregular erratic rolling.

In summing up the salient objective points of this invention one can state as follows:

1. The velocity of the flow is continuously controlled in response to the angular acceleration of the ship.
2. The acceleration of the flow is continuously controlled in response to the rate of angular acceleration of the ship.
3. Cumulative error inherent to integration of the flow is eliminated by an equalizing system operatively associated with the periods of relative quiescence.
4. Adjustability of the stabilizing system to meet on various ships, different conditions of stabilization or on the same ship to meet different conditions of navigation, at various times, is produced by a continuous change of operative association between the flow of the liquid ballast and the instruments responsive to angular movement of rolling.

Other features and advantages of this invention can be better understood from the following description in connection with the accompanying drawings.

Figure 2:
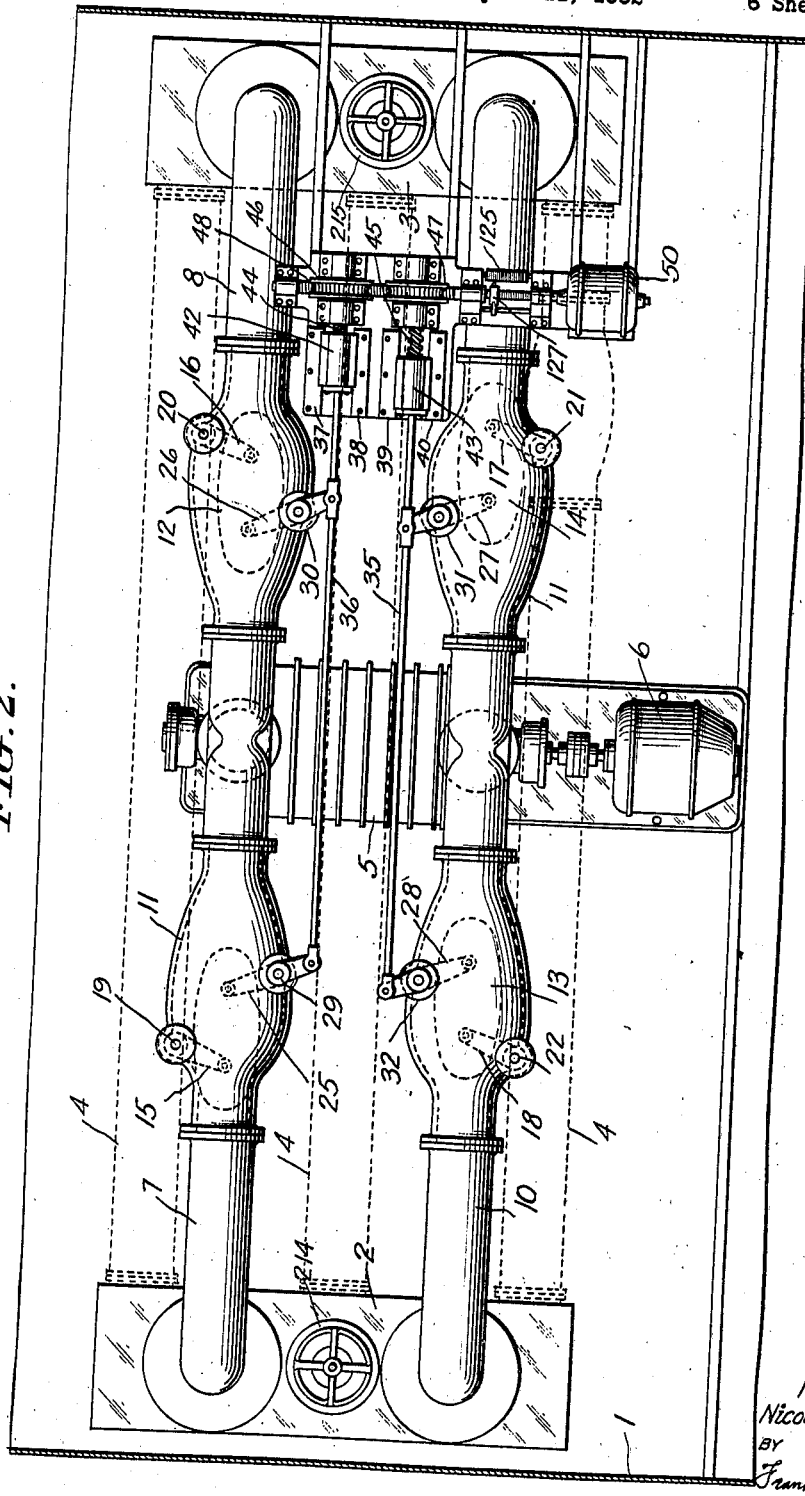

In the accompanying drawings forming part of this description:

Fig. 1 represents a transverse vertical section partially in elevation, showing one form of the stabilizing system, Fig. 2 represents a top plan of the same partially in section, Fig. 3 represents a side elevation of one form of the inertial instrument or accelerometer with part of its associated control, Fig. 4 represents a fragmentary enlarged elevation, partially broken away, of the velocity of flow responsive follow up system, Fig. 5 represents a top plan of the arrangement shown on Fig. 4, Fig. 6 represents a fragmentary enlarged detail of the control device shown on Fig. 3, Fig. 7 represents a wiring diagram of control circuits of one form of the invention, Fig. 8 represents a partial wiring diagram of a modified control system of duplicate systems as applied to the port side of the ship only with some associated parts and a modified form of accelerometer diagrammatically illustrated, Fig. 9 represents a complete wiring diagram of the form of invention shown on Fig. 8, of duplicate systems, and as applied only to the port side of the ship, Fig. 10 represents a diagram of an equalizing valve system relating to air pressure transfer systems.

Fig. 11 represents a side elevation partially in section of a form of the invention embodying an impeller control of the water transfer, Figs. 12 and 13 represent diagrammatic fragmentary sections respectively, partially in plan and elevation of the ship with an outboard non-communicating tank, Fig. 14 represents a graph of relative phases of the ship's irregular rolling and a series of diagrams of the stabilizing performance of the tanks in a series of successive time intervals.

Fig. 15 represents a similar graph and diagram incident to regular rolling and illustratively associated with the impeller control of Fig. 11, and Fig. 16 represents a fragmentary vertical section partially in elevation of an automatic heavy-sea-protective device of a pair of devices.

Referring to Fig. 1, 2 and 3 are port and starboard tanks respectively fitted into the ship 1. 4 is a cross connecting channel (or channels) between the tanks. As one form or embodiment of the invention for transferring water between the tanks I show a means for applying and using the pressure of air generated by a compressor blower or any similar device, but I wish it to be understood that other means and methods for such actuation can be used in connection with the control system forming the subject of this invention as particularly pointed out and claimed later herein. 5 is a blower either of the so-called positive or centrifugal, or any other type.

The output of the blower is connected to the tanks 2 and 3 by means of pipes 7, 8 shown partially in cross section. The suction of the blower is connected to the tanks by the pipes 10 and 11 substantially as shown.

For the purpose of a better efficiency of the plant, I propose to connect simultaneously the output of the blower to one tank, say 3, and the suction to the other, say 2, reversing connections every half a period of the roll or any time when this reversal is needed as will be shown later on. Stream line shaped valves 11, 12, 13, 14 mounted for controlled substantially axial movements in the respective pipes by means of streamlined links or arms 15, 16, 17, 18, 19, 20, 21 and 22, respectively, mounted for free oscillation on stuffing box axes, so as to either open, amplify or close or regulate the passage of the air substantially as shown, and are attached to control levers 25, 26, 27 and 28 which are also stream line shaped inside the pipes and rotatably mounted about stuffing box axes 29, 30, 31 and 32 perpendicular to the drawing of Fig. 2 and supported by brackets on the outside of the pipes near the spherical enlargement of the pipes required for location of the valves.

The levers 25, 26 are connected to the rod 35 and the levers 27, 28 to the rod 36, said rods being mounted for a limited longitudinal displacement necessary for partially or completely opening or closing the valves. The rods 35 and 36 are guided by means of guides 37, 38, 39, 40 and are connected to sleeves 42, 43 suitably guided for longitudinal motion and prevented from rotating by guides 23 and 24 respectively. The sleeves 42 and 43 are internally but oppositely threaded and respectively engage the appropriately threaded screws 44, 45 fixed to worm wheels 46, 47, respectively. The last mentioned wheels are in engagement with the worm 48 directly connected to the armature 118 of a separately excited direct current follow up motor 50. It is apparent from the foregoing description that when the motor 50 rotates the rods 35 and 36 move in opposite directions and operate the valves substantially as shown. Fig. 2 shows the extreme left position of the rod 35 and the extreme right position of the rod 36; as seen on the figure the valve 12 is wide open and the pressure of the blower is applied to the water in the starboard tank 3. At the same time the valve 13 is open and the port tank 2 is connected with the suction side of the blower. Simultaneously valves 14 and 11 are closed. The water level in the starboard tank is lowered, whereas in the port tank the level rises, in accordance with, or accompanied by, the flow of water through the communicating channel 4.

The rotation of the pilot motor 50 in the opposite direction reverses the conditions just described; the rod 35 is moved to starboard and the rod 36 to port which closes valves 12 and 13 and opens valves 11 and 14. The water in the starboard tank rises and in the port tank goes down. Intermediate conditions of pressure occur for the intermediate position of the control rods 35 and 36. It is seen that the reactions of the air streams on the valves are balanced so that the force required to displace the control rods is rather small, and the pilot motor 50 is a very small motor in comparison with the constant speed motor 6 driving the blower. Furthermore the load on the main motor 6 is substantially constant owing to the differential operation of the valves.

From the foregoing description it is apparent that the difference of pressures in the tanks is a certain function of the relative displacement of the rods and hence of the number of revolutions of the motor 50 from its central position when all four control levers 25, 26, 27 and 28 and associated valves are so disposed that the pressures in both tanks are equal.

The control of the follow up motor 50 will now be described. In order to produce a rate of flow in the connecting pipes which is proportional to the instantaneous angular acceleration of the ship, I prefer to employ the inertial instrument or accelerometer 51, shown separately on Fig. 3 and also indicated on a smaller scale on Fig. 1. This form of accelerometer or modifications thereof, such for instance as shown in Fig. 8, may be used with all of the modifications of the invention hereinafter described.

Referring to Fig. 3, 51 is a beam arranged to support two weights 52, 53; the beam is rotatably mounted about an axis 55 parallel to the longitudinal axis of the ship and perpendicular to the plane of the drawing by means of ball bearings 54. The axis 55 is supported by the casing on the upper part of which is fastened a spring 57 relieving the pressure from the bearing 54 due to the weight of the inertial elements 51, 52, 53, whereby the latter is substantially immune from any friction.

The casing 56 is fixed to the support 60 supported relatively to the base 61 with interposed vibration absorbing material or element 63. The beam 51 of the inertial element is connected through a rigid elastic link 64 to a comparatively strong flat spring 65 fastened at the other end to the supporting plate 60. An oil dash pot 67 is connected to the spring 65 through a rigid elastic link 68. Another rigid elastic link 70 connects the inertial element 51 to the amplification lever 71 pivotally mounted around the axis 72 and connected to the second amplification lever 73 pivotally mounted around the axis 74. The lever system is counterweighted by means of the weights 75 and 76. On the end of the lever 73 is mounted a plate 69 made, preferably of insulating material with two flat coils 77, 78 made of a comparatively great number of turns of fine wire (see also Figs. 6 and 7). In view of the fact that the center of gravity of the inertial element is on the supporting axis 55 the forces of inertia due to linear acceleration do not influence the inertial system and the latter is acted upon only by angular acceleration of rolling occurring about the axis parallel to the axis 55. The torque of inertia, as is known, being equal to the product of the moment of inertia of the inertial element 51 about the axis 55, times the angular acceleration, is absorbed by the spring 65 yielding by an amount proportional to the angular acceleration prevailing at any instant, and this deflection is amplified by the lever system 70, 71, 73 and the deflection of the coils 77, 78 from the middle position is in this manner proportional to the instantaneous angular acceleration of the ship. Angular movement of coils 77, 78 about the axis 74 takes place in the air gaps of two A. C. electromagnets 79, 80 energized by coils 81, 82 shown also in plan on Fig. 6. Electromagnets 79, 80 are supported by a support 85 slidably mounted between the guides 86, 87 for a slight linear movement up and down. In normal position, when no angular acceleration of rolling is acting the lever 73 is horizontal, as shown on Fig. 3 and the support 85 is in its middle position to which corresponds the symmetrical position of coils 77, 78, with respect to pole faces of the magnets shown on Fig. 6; alternating electromotive forces of equal amplitudes are induced in both coils 77, 78 in this case.

When in response to the angular acceleration of rolling the angular position of the coils 77, 78 is changed the number of flux linkages threading through the coils changes and the amplitudes of induced E. M. F. change accordingly. For example when angular acceleration to port (arrow 81) develops, the spring 65 is pressed downwards by the link 64 and the coil end of lever 73 goes down also so that the flux linkages, and hence the induced voltage in the coil 78 increase whereas the corresponding values of the flux and induced voltage in the coil 77 decrease substantially in proportion to angular acceleration. It is to be understood that only small angular deviations of lever 73 from the middle position are contemplated within such limits as will maintain the coils 77 and 78 in operative association with the magnets 79 and 80. To maintain the restricted travel it will be understood that adjustable stops 33 and 34 are suitably supported by brackets as shown, will be provided to sharply limit relative movements of the inertial element 51. On the lower part the sliding block 85 is connected to a rod 90 extending down to the interconnecting channel or pipe 4 and adapted for a small linear displacement parallel to its length. The weight of the rod 90 and the block 85 is preferably compensated by the upward push of a compression spring 91 pushing between the deck and a shoulder 93 on the rod.

Inside the connecting channel is provided a stream line shaped body 92 suspended on levers 93, 94 arranged also in a stream line shape relative to the flow through channel 4, and pivoted about axes 95, 96 mounted inside a bell shaped extension 97 on the pipe 4. This is particularly valuable in connection with the indirect or impositive transference of water by the air pressure described, but in the event of positive or direct transfer as later described in connection with Fig. 11, different, possibly simpler means can be used.

The axis 95 goes outside the extension 97 through a suitable stuffing box 98 and is supported by bearing 100. A crank 101 fixed on the outside part of the shaft 95 is connected to two springs 102, 103 suitably supported on housing 97 and centering the levers 93, 94 and the stream lined body 92 in the position shown when there is no flow in the pipe. A sleeve 104 loosely mounted on the shaft 95 is connected to the spring 105 whose other end is connected to the shaft 95 near the crank 101. The sleeve 104 is fastened to the toothed sector 106 counterweighted by the weight 107 and connected on the counterweight side to an oil dash pot 108 substantially as shown.

The sector 106 is in engagement with a smaller pinion 109 fastened to a cam 110 on which bears a roller 41 located on the lower end of the rod 90. An arrangement of auxiliary lever 112 and spring 113 is provided to maintain the contact between the cam and the roller.

Responsive to the angular acceleration to port (arrow 81) the water flows in the connecting pipe in the direction shown (that is, to starboard) as will be pointed out, the stream lined body 92 is dragged to the right until the torque due to skin friction of 92 is compensated by a corresponding deflection of springs 102, 103. The toothed sector 106 moves up and the cam 110 turns clockwise into position which causes lowering of the rod 90 with the magnets 79 and 80. For the flow in opposite direction opposite movement takes place and the electromagnets 79 and 80 are raised. The force acting on the body 92 generally varies as the square of the velocity of the flow and in order to produce the up and down displacement substantially proportional to the velocity of water in the pipe or channel 4, the profile of the cam must be chosen accordingly to effect that functional transformation. The body 92 even if made on a stream line principle is liable to produce a turbulence in the flow and be subjected to vibrations the arrangement of the elastic link constituted by spring 105 and dashpot 108 eliminates vibration from the control segment 106 and permits transmission of a damped motion to the rod 90 substantially proportional to the velocity of the flow.

The arrangement shown on Fig. 3 constitutes a follow up system between the angular acceleration of the ship registered by the inertial instrument or accelerometer 51 and the velocity of the flow which permits of obtaining a control of the type given by Equation (3)

$$\frac{dw}{dt} = \mu \frac{d^2\theta}{dt^2}$$

The electrical circuits controlling the pilot motor 50 in accordance with the principles set forth are shown on Fig. 7.

Referring to Fig. 7, 115 is a direct current generator, driven by a motor 116. Generator 115 is connected to the pilot motor 50 in the so called Ward Leonard connection in which the armature 117 of the generator is connected to the armature 118 of the motor 50 and the field 119 of the motor is separately excited. Control of the speed of the motor 50 with associated valve control of the blower is accomplished by varying the field of generator 117. A series brake 120 is provided on the shaft 48 of motor 50 with coil 121 in series in the circuit of armatures 117, 118. Generator 115 operates on the low value of its saturation curve so that the modification of resultant exciting ampere turns is characterized by a substantially proportional variation of the generated voltage. Generator 115 has three differentially wound split fields 122, 123 and 124. The fields 122, 123 are constituted by a greater number of turns of thin wire and the field 124 is made of a smaller number of turns of heavier wire.

The thermionic system controlled by modulation of electromotive forces induced in coils 77, 78 of angular acceleration responsive instrument 51 will now be described. Coils 77 and 78 are connected by one end to the cathode side of the thermionic system. Tubes or valves 132, 134 are adapted to work as amplifiers substantially on the rectilinear part of their characteristics by means of a suitable bias 135. Transformer coupling 142, 143 is shown to actuate the power tubes 130, 131 adapted to work as rectifiers by means of a suitable biasing electromotive force, shown as battery 144. Power tubes 130, 131 are connected to the differential split field 122 substantially as shown. Between the plates of tubes 130, 131 and the field 122 are inserted inductances of filter circuits 146, 145 forming with the associated capacities high frequency by pass smoothing out fluctuations of the rectified current. Between the filters 146, 145 and the split field 122 are inserted the primaries of two high ratio transformers 136, 137. The secondaries of these transformers are connected to the negative terminal common to the thermionic tubes through a source of a suitable biasing electromotive force, not shown, the remaining ends of these secondaries are connected to the grids of the power tubes 138, 139 whose plates are connected to the split field 123 substantially as shown. The central taps of the differential fields are connected to the common positive terminal of the thermionic system. The source of the voltage supply for the tubes is shown as a conventional B eliminator 140 connected across the terminals of a small alternating current generator 141 shown to be connected on the same shaft as the motor generator set 116, 115. The same generator 141 energizes coils 81, 82 of electromagnets 79, 80. The negative end of the direct current supply 140 is connected to the common cathode connection of the thermionic system.

In addition of the follow up system between the movement of the coils 77, 78 of the accelerometer and the response of the flow reestablishing the equilibrium by bringing back the magnets 79, 80 in alignment with the coils through the intermediary of the rod 90 operated by the flow, there is a second follow up system on the follow up motor 50. To this end I provide an additional split field 124 connected to a resistor 125 arranged in parallel position to the shaft 48. A sliding contact 126 fixed mechanically to, but insulated electrically from, the traveling nut 127, establishes the contact with the resistor 125. Contact 126 and the central tap of the field 124 are connected to the supply of direct current 128, 129.

It is apparent that when the contact 126 moves towards the motor 50 more current flows through the right half of the coil 124 and less through the left one and vice versa for the opposite motion of the contact 126.

The described arrangement should not be considered in a limiting sense as a number of various modifications of the invention is possible within the scope of the appended claims. Fig. 8 gives by way of another example a control system accomplishing substantially the same result as that shown on Figs. 3, 4, 5, 6 and 7, but in which a certain number of elements of electrical control are replaced by hydraulically operated elements.

Referring to Fig. 8, 150 represents a block of heavy metal such as iron, lead, or the like, suspended on a long spring 151 shown as broken away in the middle and supported by means of a bracket 152, fastened to the port side of the ship 1. In view of the fact that an exactly similar equipment is mounted on the starboard side of the vessel, the following description and the drawings relate only to the instrument and circuits relative to, or operatively associated with, the port side of the ship.

The block 150 is guided for a limited movement in a substantially vertical direction by means of three pairs of antifriction rollers 153, 154, 155 supported by shafts perpendicular to the drawing and capable of rolling with only a slight friction on the machined parallel guiding surfaces 156, 157 of the guide bracket 158, fastened to the ship substantially as shown. On the lower part an oil damper 160 containing oil or other damping viscous fluid is provided.

A bell shaped support 163 fastened to the rod 159 supports on its lower end a ring 162. The container 160 is fastened to the ship and has in the center an axial tubular extension 164. The rod 159 passes through the tubular extension 164 and has fastened on its lower end the upper wall of a deformable vessel or bellows 165 the lower wall of which is suitably fixed to the ship. The bellows is comprised of a corrugated preferably cylindrical surface made of a resilient material such as steel, phosphor bronze, rubber, and the like. The bellows 165 communicates by means of a tube 166 to a U shaped glass tube 167. The tube 167 has in its lower part a small amount of mercury 168, in which is immersed a thin high resistance rod 169 similar to so called grid leaks used in radio circuits. It is known that the specific resistance of such rods per unit length can be made of any value depending on the thickness of the conducting coating or layer from a few ohms up to several megohms per inch, for instance. As a coating material such material should be used which mercury does not attack and in order to avoid the oxydation of the latter an inert gas such as argon for example may be sealed inside the bulb 170 which merges into and communicates with tube 167, and which at the same time may be used as a compression chamber 170 when the mercury level varies in the tube 168. All of the U tubes subsequently described have similar bulbs, preferably. From the preceding description it is apparent that when the ship undergoes angular acceleration $$\frac{d^2\theta}{dt^2}$$

of rolling a proportional linear acceleration $$\frac{d^2x}{dt^2}$$

directed substantially along the axis of the rod 159 takes place and the force of inertia $$-m\frac{d^2x}{dt^2}$$

where $m$ is the mass of the block, that is its weight divided by $g$ acceleration of gravity acts upon the deformable vessel 165, modifying the extent of its deformation and thus causing the hermetically sealed, preferably non-conducting fluid filling vessel 165, pipe 166, and the left side of the U tube 168 in or out substantially in proportion to the instantaneous value of angular acceleration of the ship, which thus modifies the level of mercury in the U tube and hence the amount of resistance of the rod 169 determined by the height of the mercury. The resistor 169 is sealed through the glass and communicates with the terminal 172 and the mercury with another terminal 171 also sealed through the glass. The variation of electrical resistance between the terminals 171, 172 is thus proportional to the instantaneous angular acceleration of the ship. The diameter of U tube must be small enough to assure the desired sensitivity and not too small in order to avoid the phenomena of capillarity which might otherwise interfere with the performance of the instrument.

A similar U tube 173 communicates with a deformable container or bellows 174 similar to container 165. The force actuating the container 174 is derived from the drag exerted on the stream line body 92 placed in the cross channel 4 as was extensively described in connection with Figures 3 and 4 and not shown in detail on Fig. 8 for this reason, as its function and arrangement is exactly similar.

A facsimile bellows 180 is operatively associated with the traveling nut 127 capable of axial motion along the shaft 48 of motor 50 as shown in detail on Fig. 7. The operative association is shown to be established by means of a fork 181 having a fulcrum axis 182 and engaging stud 183 on the traveling nut. The opposite end 184 of lever 181 is connected to the bellows 180 by a link 185.

Bellows 180 is connected to U tube 190 similar to tube 170 and 173 previously described. Tubes 167, 173 and 190 and their associated resistance rods are connected electrically in series substantially as shown, and when the mercury levels vary the resistance of the whole circuit between the terminal 171 on tube 167 and 191 on the rod of tube 190, is varied; this last mentioned resistance is connected in series with the condenser 192 connected across the primary of a transformer 175. The circuit containing the condenser 192 and the variable resistor formed by the three U tubes between the points 171 and 191 is closed on the source of A. C. supply across the terminals 176 and 177 and constitutes a phase shifting network operating two hot cathode grid controlled rectifiers 186, 187, whose cathode heating elements are omitted on Fig. 8.

A transformer 178 is connected by its primary to the source of supply between the terminals 176, 177 and its secondary 179 is connected to the anodes of the rectifiers 186, 187. The secondary of the grid transformer 175 is connected to the grids of the rectifiers. The central tap on the secondary is connected to the central taps of the filament heating transformers (not shown) and thus is at the potential of the cathode, and is connected directly to the terminal 194 of the direct current line. The central tap on the secondary of the transformer 178 is connected to the other terminal 193 of the direct current line. It is well known that the average output of such system of two wave rectifiers can be controlled by shifting the phase of the grid voltage which is obtained by means of the variation of resistance between the points 171 and 191 of the circuit shown. Operative association of the controlling system shown on Fig. 8 with other parts of electrical control of the blowers is indicated on Fig. 9 in which the U shaped variable resistors are indicated diagrammatically as wire resistors.

The circuit to the left of the terminals 193, 194 is the same as that shown on Fig. 8. A high frequency by pass filter 251 formed by inductances and condensers is connected across the direct current terminals 193, 194 of the rectifier system in order to obtain a substantially constant and non-fluctuating output of the rectifiers. This output is passed through the primary of the transformer 136 of which the secondary is operatively associated with the tube 139 as was explained in connection with Fig. 7. The rectifiers operatively associated with the instruments of the starboard side, not shown, are connected to the primary of the transformer 137 while its secondary is connected to the tube 138 as previously explained. The differentially wound split field 123 of the tubes 138, 139 responsive to the rate of angular acceleration $$\left(\frac{d^3\theta}{dt^3}\right)$$

of the ship are shown on Fig. 9 to act on the magnetic structure of a separate generator 250 driven by the shaft 48 of the main motor generator set 115, 116 and the armature 252 of this generator 250 is shown to be connected in series with the armature 117 of the generator 116. In the arrangement shown on Fig. 9 electromotive forces responsive respectively to angular acceleration (armature 115) and to rate of angular acceleration (armature 252) are combined whereas in the arrangement shown on Fig. 10 the combination is effected on the ampere turns and not on the E. M. forces. Furthermore the responses of the double follow up system is incorporated as one component of the field 122 on Fig. 9 whereas in the arrangement shown on Fig. 7 a separate field 124 is provided for one follow up system whereas the other rate of flow follow up is incorporated on the instrument side of the arrangement (rod 90 with associated magnets 79 and 80).

These widely different forms of controlling instruments and circuits have a substantially identical performance as is apparent from the foregoing description.

Comparing the arrangement shown on Fig. 8 with the previously described one shown with reference to the control derived from the accelerometer shown on Fig. 3 it is apparent that the accelerometer 150 shown on Fig. 8 responds not only to rolling but also to pitching and heaving of the ship or any combination of these motions which will cause a change in the level of the mercury column 168 and thus will modify the amount of resistance between the points 171 and 191 controlling the phase of the voltage impressed on the grids of rectifiers 186, 187 which will modify either the instant of their starting or in general their average output. It will be apparent, however, that exactly similar components of acceleration due to pitching or heaving will be impressed on the second accelerometer (not shown) situated on the starboard side of the vessel which will cause substantially the same modification either in starting or in the average output of the corresponding rectifiers (not shown) operatively associated starboard accelerometer (not shown). It follows therefore, that although pitching or heaving or their combination will affect the rectifiers operatively associated with the port and of the starboard side it will affect them equally and in the same direction so that the resultant effect of the differential split field due to these motions of pitching or heaving will be nil and by the same line of argument it will be readily understood that no resultant effect will be exerted on the magnetic structure of the auxiliary generator 250 responsive to the rate of acceleration of rolling. It follows therefore that the level of mercury in the tubes 173 and 190 will not be affected by pitching or heaving. From the foregoing description it is apparent that the system shown on Fig. 8 responds selectively to rolling when the accelerometers of the port (150) and of the starboard (not shown) sides act additively in the control and is immune against pitching or heaving or any of their combinations, by virtue of the above described elimination of these disturbances in the differentially wound fields. It can also be clear that temperature variations which may modify the levels of mercury in the tubes 167, 173, 190 owing to the expansion of the inert gas in the bulbs of the tubes also cancel out their effects in the differential effects of oppositely wound fields of generator 115.

The preceding description relates to the control of the rate of the flow and of the acceleration of the flow in response to angular acceleration $$\left(\frac{d^2\theta}{dt^2}\right)$$

and to the rate of angular acceleration of rolling, whereby the excess of water instantaneously concentrated on the rising side of the vessel at all times is made to be substantially proportional to the instantaneous angular velocity of the vessel. This concentration is obtained by the process of integration of the rate of the flow with respect to time. It is well known that in all methods or apparatus utilizing integration processes a cumulative error is possible. In this particular case this would mean that the liquid ballast may drift slowly to one side of the vessel. The simplest theoretical method of obviating this difficulty would consist in introducing a directional control derived, for example, from a long period pendulum, as is disclosed in my co-pending patent application Ser. No. 544,651. In the instant invention it is preferred to produce equalization of the ballast from time to time by means of the control shown on Fig. 10, for the following reason. In view of the irregularity of the waves encountered periods of a relative quiescence occur from time to time as the records of rolling definitely show. These periods of quiescence are generally of short duration and are manifested as flat spots in the acceleration as well as in the rate of acceleration curves, that is, when these quantities continue to be small for a short interval of time as will be readily appreciated from an inspection of Fig. 14. No appreciable moment is transferred from the waves on the ship during such time intervals and the currents flowing in the branches of differential fields 122, 123 of the generator 115 are equal, or substantially equal, as will be clear from what has been explained previously. Referring to Fig. 10, 200 and 201 are two relays having each differentially wound field coils inserted respectively in series with the differential fields 122, 123 of the generator 115. Armatures 202, 203 of the relays when the relays are not energized close contacts of an auxiliary circuit as shown, energizing solenoids 206, 207 arranged to open relief valves 208 and 209 on both tanks 2 and 3. The valves 208 and 209 are normally closed by means of the springs 210, 211 (Fig. 1) exerting downward pressure against the rods 212, 213 bearing the valves 208, 209 and suitably supported and guided by means of suitable brackets 214, 215 secured to the tops of the tanks substantially as shown.

From the above description it follows that whenever a point of quiescence develops both relays 200 and 201 are deenergized which energizes the solenoids 206 and 207 and opens the valves 208 and 209 whereby these instants of quiescence are utilized to eliminate automatically any cumulative excess of water which might occur in the long run as inevitable in the process of integration of the flow.

In the preceding description the control of the stabilizing moment is produced by the corresponding control of the blower pressure applied to the water ballast whereby the latter undergoes displacements in accordance with Equation (2) both for regular and irregular rolling as will be shown in the following.

The invention, however, is considerably broader than this particular method of actuating these displacements and I wish it to be understood that any other possible method or means for producing the displacements of the liquid ballast in accordance with the above method can be adapted for the control of the type described. By way of another example Fig. 11 shows another displacement actuating mechanism operatively associated with similar controlling instruments and circuits which therefore gives substantially similar roll quenching characteristics, as the blower control previously described.

Referring to this Fig. 11, 300 is a propeller or screw fitted into a flanged section of the cross channel 4 characterized as 311. The screw 300 is mounted on a shaft 301 supported by bearings 302, 303 made preferably of lignum vitae as commonly used in bearings of ship propellers and supported by suitable flanges or spiders 304, 305 of a preferably stream line cross section so as not to interfere with the flow of water through the channel 311. The shaft 301 is passed through the channel 311 and emerges from inclined sections 319, 320 of channel 4 by means of bearings 306, 307 mounted in the walls of the respective inclined sections 319, 320, which bearings serve also as stuffing boxes. The shaft 301 is connected directly to the shaft of a variable speed reversible hydraulic preferably oil motor 308 connected by means of oil lines 312, 313 to the variable delivery oil pump 314 driven by a constant speed electric motor, not shown, by a shaft perpendicular to the plane of the drawing. The control member 309 of the oil pump (shown as a conventional Hele Shaw pump) designated sometimes according to the type of the pump as "floating ring" in the instant disclosure, "tilting box" etc. in other types of pumps is adapted for longitudinal displacement by means of a screw drive 310 of the pilot motor 50. It is well known that for a given displacement of the rod 309 of the control member of the pump 314 from its middle position, and hence for a given position of the control member there is a correspondingly definite rate of discharge of the pump, therefore, a definite speed of the hydraulic motor 308. By a suitable design of the screw 300 and the central channel 311 the cavitation phenomena can be substantially eliminated. Furthermore the design of the screw must provide equal performance for opposite rotation of the shaft 301.

For given pitch, diameter and slip of the screw in a steady state condition the propeller delivers a certain rate of discharge which is a definite function of these quantities. If the slip varies the momentum transferred by the screw to the water in the channel 4 is varied, so that it is possible by a suitable control of the slip and hence of the speed of the shaft 301 to change the rate of flow of the liquid ballast through the channel 4.

It is apparent that the remaining parts of the controlling system remain substantially the same as previously described. For this reason they are indicated only diagrammatically on Fig. 11 omitting any such details as have been already described. The stream line body 92 with associated ports, shown in detail on Figs. 4 and 5 is shown on Fig. 11. The angular displacements of the body 92 under the influence of flow through a suitable functional transformation system such as cam 110, Figs. 4 and 5, and intended to transform the proportionality to the square of velocity of the fluid characterizing the reaction or drag of the fluid on the body 92 into a linear or proportional to the velocity law, is applied by means of a sprocket chain 320 to the rotor of a well known angle transmitting system 321, 322 comprising a transmitting element 321 and a receiving element 322, said elements being constituted by electromagnetic devices with interconnected polyphase stators and single phase rotors closed on a source of alternating current supply (not shown). For the sake of simplicity the well known wiring diagram is omitted and the electromagnetic devices 321, 322 are shown as connected by a single cable containing all necessary wires. This furnishes a remote control, if desired, for the potentiometer 326, although obviously this may be directly connected to the stream line body 92, when no remote control is needed. The receiving element 322 is connected by means of a suitable connecter shown as a sprocket chain 324 to the arms 324, 325 insulated electrically from the rest of the apparatus, but bearing on the potentiometer 326 connected to the direct current supply between two diametrically opposite points 327 and 328. The movable contacts 324 and 325 are connected across the field 321 of the generator 115 which field introduces a follow up action responsive to the rate of flow, through the instrumentality of the stream lined body 92, synchronous angle transmitting system 321, 322, if used, and the potentiometer 326. When there is no flow in the cross channel 4 and the stream line body 92 is in its central position the line of contacts 324, 325 is at right angles to the line 327, 328 on the potentiometer, and the contacts 324, 325 are at equal potential and no current flows through the field 321. Responsive to the velocity of the flow the contacts 324, 325 rotate along the potentiometer in one direction or the other in proportion to, or as a certain function of, the rate of the flow through the channel 4 and the current through the follow up field 321 flows substantially in proportion to the rate of flow of the liquid ballast through the channel. The above mentioned functional transformation in another form, can be incorporated conveniently in the potentiometer design so as to have a suitably distributed resistance of the potentiometer for a given angle of rotation of the contacts 324, 325, so as to substantially effect this transformation electrically without any mechanical devices such as cam 110, shown on Figs. 4 and 5.

Under these conditions the ampere turns of the follow up field 321 can be made substantially proportional to the rate of flow of the liquid through the channel 4 both in direction and magnitude. The remaining parts of the scheme shown on Fig. 11 remain substantially the same as previously described in connection with Figs. 7, 8 and 9.

For instance the field 122 is connected in the circuit of the tubes or valves 132, 134, responsive to angular acceleration of the ship and the field 123 of the phase advancing generator 250 responsive to the rate of angular acceleration or to the third time derivative $$\frac{d^3\theta}{dt^3}$$

of the ship's rolling is connected to the tubes 138, 139 as previously described.

In the preceding disclosure the regulation of the direct or actual transfer of water between anti-rolling tanks through the cross channel 4 was described. It is known that in some instances the outboard anti-rolling tanks without any interconnecting channel 4 are used. Such outboard tanks are fitted with an opening or a series of openings communicating the tanks with the outboard water. When the ship rolls the openings, normally slightly above water line, submerge in the water and pick up a certain amount of outboard water which falls back into the sea when the vessel rolls in the opposite direction, so that these openings rise above the average level of the sea. Such outboard tanks are very inefficient, in view of wrong timing of filling and emptying, complicated by the phenomena of "effective orifice", dependence upon the speed of the vessel, form of the waves, to say nothing of their being inoperative on a confused sea. The above described controlling system can be applied to improve the efficiency of such outboard tanks as will now be described. Referring to Fig. 12 representing the plan view of the port tank 399, 400 is the outboard opening (for which may be substituted a plurality of openings), into which is fitted a frame 401, pivotally mounted for a limited angular displacement about an axis perpendicular to the normal water line of the ship, as shown also on Fig. 13. The pivotal axis 402 of the frame 401 is supported by a step bearing 403 and by a guide bearing 404. The shaft 402 extends upwards and emerges from the tank through a suitable stuffing box 405 which serves as an additional bearing. A sector 406 is fastened to the shaft 402. The sector 406 has a worm wheel thread 407 engaging the worm 408 of the motor 50. The frame 401 is thus capable of being rotated by the motor 50 over a certain angle about its middle position when it is flush with the outboard surface of ship 1. The maximum angular movement is limited to a certain angle *b* on both sides of the central position; the choice of the angle *b* is dictated by hydrodynamical consideration. The rotation of the frame 401 in one or the other direction from the middle position introduces a "scoop" effect whereby the flow of water in, or from, the tank into the sea can be somewhat controlled, as long as the opening remains submerged. The intake of water into the tank can be facilitated by the scoop action when the frame 401 is in position *a* and the outflow of the water from the tank can be activated when it is in *c* position. The motor 50 may have a substantially similar control as previously described, but from the standpoint of the power rating it must be a somewhat larger motor than the pilot motor 50 shown in preceding figures, as more power may be needed in this case. Owing to the possibility of controlling the flow of water into, or out of the tank when the opening is in the immersed position it is thus possible to improve somewhat the efficiency of the outboard tanks by approaching their performance closer to the theoretically optimum condition of roll quenching formulated by Equation (2). It is also apparent that both the blower method and the impeller method can also be used in conjunction with the controlling instruments and circuits for outboard tank control with the advantage over the scoop method in that the control of the flow is not necessarily limited to the periods of time when the opening 400 is in the state of immersion, as is inherent in the scoop method shown on Figs. 12 and 13.

The performance and operation of the stabilizing system will now be described. In view of the fact that the passive tank system offers a comparatively satisfactory roll quenching action when the waves are regular and when the conditions of a substantial resonance between the waves, ship and the tank are fulfilled, it is important to show that the controlling system forming the subject of this invention provides a satisfactory solution of the problem when the above mentioned conditions do not exist (as for instance when the waves are irregular), and when, consequently, the passive tank system fails to quench the rolling. Conversely, if the controlling system of the type described is capable of quenching the irregular rolling it is apparent that the regular synchronous rolling with the above specified conditions of resonance will be quenched eo ipso and the system will function at this particular point with a reduced call upon the external power, as will be shown.

The actual rolling, however, is practically always irregular and the regular trochoidal rolling is a rare exception rather than the rule.

For this reason the description of the performance in the following will be made with reference to an essentially irregular or erratic rolling from which the advantages of this invention can be particularly well ascertained and appreciated.

Referring to Fig. 14 the curves on the upper part of the figure represent the conditions of a confused sea plotted against time as abscissa. More specifically curve $a$ is the angle of roll actually observed on a vessel having a comparatively high metacentric height and subjected to a train of irregular waves.

Curve $b$ is the slope curve for the curve $a$; it represents therefore the instantaneous angular velocity $$\frac{d\theta}{dt}$$

of rolling.

Curve $c$ is the slope curve for the curve $b$ and represents angular acceleration $$\frac{d^2\theta}{dt^2}$$

of rolling.

Curve $d$ is the slope curve for the curve $c$ and shows the rate of angular acceleration $$\frac{d^3\theta}{dt^3}$$

otherwise the third time derivative of rolling.

Curves $b$, $c$ and $d$ are each susceptible of double interpretation. One relative to the motion of the ship, and the other relative to that of the liquid ballast. These curves are plotted to different scales (not indicated on Fig. 14) representing for curve $a$ (for example) degrees on the axis of ordinates, for curve $b$—degrees per second, for curve $c$—degrees per second, and finally for curve $d$—degrees per (second)$^3$. The upper part of each curve ($b$, $c$, and $d$) shown in dotted line relates to starboard relationships (e. g. angular velocity to starboard, etc.), while the lower part (full line) of the same curve relates to port relationship (e. g. angular velocity to port, etc.).

In view of the fact, however, that the timing of the water ballast must take place in accordance with Equations (2), (3) and (4), curve $b$ represents also to a different scale the excess of water in the tanks on the port side, when the angular velocity is to starboard (i. e. dotted part of the curve $b$) and on the starboard side when the angular velocity is to port (i. e. full line part of curve $b$).

Likewise, curve $c$ (angular acceleration $$\frac{d^2\theta}{dt^2}$$

of rolling) also may represent, to a different scale, the rate of flow $$\frac{dw}{dt}=\ddot{w}$$

in the connecting channel 4 occurring to port when the angular acceleration is to starboard and vice versa, which also follows from Equation (3). Finally, curve $d$ representing the rate of angular $$\frac{d^3\theta}{dt^3}$$

of the ship, by virtue of Equation (4) may represent, to a suitable scale, the acceleration of the flow $$\frac{d^2w}{dt^2}$$

in the channel 4 to port, when the rate of acceleration of the ship is to starboard and to starboard when this rate of acceleration is to port.

On the lower part of Fig. 14 is diagrammatically represented a series of successive angular positions of the vessel at different instants of the irregular rolling, corresponding to the time scale of the abscissa axis. Small arrows beneath the figures represent direction of flow through channel 4, and by their length approximately indicate the magnitude of the velocity of flow at each instant. The arrows above the figures in a similar manner indicate the direction and approximately also the magnitude of angular velocity $$\frac{d\theta}{dt}$$

of rolling. For the sake of clarity the angular deviations of the ship are greatly exaggerated and it is assumed that a residual irregular rolling exists of the same general type as shown on the curves and that its presence is sufficient to actuate the instruments and circuits in such manner as to displace the water ballast in accordance with Equations (2), (3) and )4).

In order to be able to describe the operation it is necessary to assume initially that a certain condition of motion of the ship and of the ballast exists, and to ascertain that by the action of the stabilizer the displacements of the ballast are continuously maintained in accordance with the subsequent residual motion, whereby the operativeness of the stabilizer thus will be demonstrated.

Such description is, of course, only a partial one insofar as the residual motion assumed here as given in advance in reality is the result of operation of the stabilizer. The complete solution of the problem requires solution of the system of two differential equations, one relative to the ship and the other to the ballast, with suitable terms characterizing the coupling between these two systems and is irrelevant to the description of the invention proper.

For this reason an approximate description of performance of the stabilizer proper, assuming the existence of a certain irregular residual rolling characterized by curves $a$, $b$, $c$ and $d$, is given below.

The theoretical conditions set forth by Equations (2), (3) and (4) are as follows:

Equation (2):

$$w = -a\frac{d\Theta}{dt}$$

excess of water $w$ must be situated at all times on the rising side of the vessel and must be varied continuously so as to be substantially proportional to the instaneous angular velocity $$\frac{d\Theta}{dt}$$

of rolling.

Equation (3):

$$w = -a\frac{d^2\Theta}{dt^2}$$

the rate of transfer $$\frac{dw}{dt}$$

of water and, consequently, the velocity of flow in the cross channel 4 must be substantially proportional at any instant to the angular acceleration $$\frac{d^2\Theta}{dt^2}$$

of the ship and must be directed in the direction opposite to that in which this angular acceleration is taking place—which accounts for the minus sign in this and other formulæ.

Equation (4):

$$\ddot{w} = \frac{d^2w}{dt^2} = -a\frac{d^3\Theta}{dt^3}$$

the acceleration of the flow in the cross channel 4 must be substantially proportional to the rate of variation $$\frac{d^3\Theta}{dt^3}$$

of angular acceleration of the ship, otherwise to the third time derivative of the rolling motion.

As the initial instant, the instant I is chosen when the ship has reached a maximum swing to port and when, consequently, the velocity of the flow to port is a maximum. The description is made with reference to the arrangement shown on Figs. 3, 4, 5, 7 although the following description is equally applicable to Fig. 11. At the initial instant I the coil end of lever 73 (Figs. 3 and 7) is moved upwards in view of the acceleration to starboard at this instant. The amplitude of E. M. F. induced in the coil 77 increases and that in the coil 78 decreases, which unbalances the thermionic push pull system of the tubes 130, 131 in the manner previously described. The follow up motor 50 starts to run through a number of revolutions proportional to the magnitude of the unbalancing and hence in proportion to the magnitude of angular acceleration at this instant I until the compensating action of the field 124 regulated by the contact 126 moved along the resistor 125 stops it. The blower output is thus directed more to the starboard tank than to the port one and the flow of water develops in channel 4 from starboard to port gradually increasing the level of water in the port tank substantially in proportion to the increase of angular velocity (curve $c$) of the vessel to starboard. As a result of the flow the stream line body 92 (Fig. 3) is deviated to port to the left on Fig. 3 which raises the rod 90 and causes approach of the electromagnets 81, 82 to the position of the coils 77, 78 which decreases the initial amount of unbalancing of the thermionic system 130, 131, and to meet this disappearing unbalanced condition the follow up motor starts in the opposite direction seeking the new point of equilibrium, which reduces the output of the blower on the starboard tank and decreases the velocity of the flow to port. The water in the port tank rises but the rate of this rise gradually decreases with the approach to the instant II. During this period the inductive coupling by means of transformers 136, 137, whose secondary induced voltages are substantially proportional to the third time derivative of angular motion of the ship, in view of the arrangement disclosed, reduces the field of the generator 115 by operating on the grids of tubes 138, 139 and thus modifying the ampere turns of the auxiliary split field 123 so as to advance the instant at which the blower pressure on the starboard tank is reduced and also to advance the instant at which the cushioning counter pressure on the port tank is applied, whereby the reversal of the flow at the instant II is facilitated. The action of the inductive coupling responsive to the third time derivative $$\frac{d^3\Theta}{dt^3}$$

is thus to produce an "easing off" action of the blower, which reverses its action slightly ahead of the theoretical instant of reversal in order to take into account the inertia of the moving water. At instant II the ship passes through the even keel condition with no flow in channel 4 and with the angular velocity to starboard just slightly past its maximum value. The excess amount of water concentrated in the port tank is substantially proportional to the magnitude of angular velocity at this instant in accordance with the optimum damping condition expressed by Equation (2).

Referring now to the time interval II—III it is seen that the angular acceleration to port (which is clearly equivalent to the rate of decrease of angular velocity to starboard) is gradually increasing. The spring 65 (Fig. 3) is pressed down and the coil end of the lever 73 is moved down accordingly. The amplitude of the E. M. F. induced in the coil 78 is now increasing; that of the E. M. F. induced in the coil 77 is decreasing, which unbalances the thermionic push pull system of power tubes 130, 131 in the direction opposite to that which was previously described in relation to the time interval I—II. The blower pressure is directed now more into the port tank, increasing the rate of the flow to starboard up to a maximum, approximately in the middle of the interval and then reducing it again (instant III). The performance of the double follow up system is exactly the same as before and does not need to be repeated. During the first half of the interval II—III the valves or tubes 138, 139 operated in response to plate-current variation of the valves 132, 134 introduce additional ampere turns in the split field 123 which accounts for an advance in the application of the pressure to the port tank, which leads or precedes an analogous action exerted by the valves 132, 134. The valves 138, 139 thus exert a "meeting action" as far as the acceleration of the flow of water to starboard is concerned. It is to be noted that this acceleration is somewhat facilitated by the fact that the water is accelerated downhill in view of the fact that the ship is inclined to starboard during this period. During the second half of the interval II—III the valves 138, 139 again exert an "easing off" effect whereby the velocity of the flow to starboard is gradually reduced.

The time interval III—IV characterizes particularly well the irregularity of the disturbing moment applied by the wave slope to the ship. The earliest fore-runner or anticipating factor of the irregularity appearing between III—IV appears substantially around the point III, in the fact that the curve d ceases to increase as rapidly as it should if following along line A—B and begins to decrease shortly after point III. The "easing off" action exerted by the valves 138, 139; instead of being continued after the point III as would be the case of a regular rolling, is reduced between the points P and Q, which is transmitted again through the instrumentality of the valves 138, 139 and the differential field 123 so that the velocity of the flow instead of following the variation substantially along line LMN of the diagram, that is, reversing to port at the point M, is reversed only at the point S and thus matches the development of a "flat spot" in the acceleration curve c in the region between the points M—S—T.

In the case of a passive tank system the velocity of the flow in the channel 4 would follow line LMN instead of following line LSR and for this reason the useful action of the passive system would be lost at the point L and such passive tank system would become inoperative and indeed would exaggerate or enhance that condition it is designed to correct. The velocity of the flow temporarily delayed by the anticipatory control of the valves 138, 139 in the region between the points M—T will be again increased and the more or less regular character of the impressed disturbing torque of the sea will appear after the instant IV and the various phases of controlling actions can easily be analyzed further in the manner in which the analysis was applied to the time interval I—II—III—IV.

The controlling action exerted by the instruments on the flow of the water will be at all times represented by a curve (not shown) lying in the region between the curves $$c\left(\frac{d^2\theta}{dt^2}\right)$$

and $$d\left(\frac{d^3\theta}{dt^3}\right)$$

depending on the relative importance of the angular acceleration control (tubes or valves 130, 131) and the rate of angular acceleration control (tubes or valves 138, 139). If the former is predominant the blower action will be directed more in accordance with the angular acceleration $$\frac{d^2\theta}{dt^2}$$

(curve c), whereas in case of the predominance of the latter this blower action will approach nearer the curve d representing the rate of angular acceleration $$\left(\frac{d^3\theta}{dt^3}\right).$$

This change in the character of the resultant control can be accomplished for example by shunting the fields by means of variable resistors 210, 211, shunting the field 122 (Fig. 9) or by means of a variable ratio of transformation shown on the secondaries of transformer 136, 137 or by suitable well known methods whereby the predominance of field 122 as compared to field 123 can be either increased or decreased. The intensity of the controlling action can furthermore be varied, for example, by means of a resistor 212 inserted in series with the alternating current feeding the coils 81, 82 of the magnets 79, 80 whereby the coupling coefficient a can be suitably changed so as to adjust the performance to suit the conditions.

These various adjustments and regulations together with the continuity of actions exerted by thermionic systems permit a close following of the disturbance by means of the water ballast concentrated at all times on the rising side of the vessel so that the amount of the excess ballast remains substantially proportional to the instantaneous angular velocity of the ship at this instant, whereby the potential energy of the disturbing wave slope is consumed in a continuous raising of the extra weight of water and the rolling remains quenched both for regular or irregular waves.

The analysis of the performance for the regular rolling follows the same line of argument as was applied in connection with the part I—II of Fig. 14 where the rolling is regular. It is important, however, to emphasize another important feature of an active stabilizer of the type described, namely, substantial reduction of residual rolling as compared to the case of a passive stabilizer, when the rolling is of a more or less regular character. As previously stated the provision of an externally applied force or pressure obviates the necessity for the potential head being provided. The acceleration of the ballast in an athwartship direction in the active type stabilizer is charged to the external source of power and not to the potential head arising from the angle of rolling as in case of a passive system. In other words, the ship does not need to roll over appreciable angles in order to produce its stabilization which is clearly a mutually excluding condition explaining the low roll quenching efficiency of the passive tank system.

In order to emphasize this important feature the description of the performance is made with reference to Fig. 15. The curves on the upper part of Fig. 15 are the same as corresponding curves of Fig. 14. In view of the assumed regularity of rolling the analysis is limited only to one half cycle or period since during the other half cycle the conditions are symmetrical and it is sufficient in the following description to substitute the word "starboard" for the word "port" and vice versa in order to have the analysis of performance extended to the second half period.

On the lower part five subsequent positions of the ship corresponding to the instants I, II, III, IV, V of the upper curves are shown.

Referring to Fig. 15, during the time interval I—II, the angle θ to starboard gradually increases and angular velocity $$\frac{d\theta}{dt}$$

of rolling to starboard decreases. This time interval thus corresponds to the beginning of the time interval II—III of Fig. 15 with respect to which the behavior of instruments has been already described. Angular acceleration $$\frac{d^2\theta}{dt^2}$$

to port (curve c) gradually increases during this time interval I—II and this gradually reduces the angular velocity of the ship to starboard. Responsive to the gradually increasing acceleration $$\frac{d^2\theta}{dt^2}$$

to port the inertial instrument or accelerometer will gradually increase the degree of unbalance of the thermionic system of the tubes 130, 131 operatively associated therewith which will start the pilot motor 50 in the corresponding direction so as to increase the rate of delivery of oil by the pump 314 and increase the rate of rotation of the hydraulic motor 308 so as to increase the positive slip of the screw 300 to the extent at which the acceleration of water to starboard in the connecting channel is built up so as to produce a velocity of the flow satisfying the theoretical relation (3), at this instant the stream line shaped body through its associated potentiometer control reduces or even reverses the excitation of the generator 115 through the follow up field 321 which will finally react through the instrumentality of the hydraulic transmitting system 314, 308 on the corresponding reduction of the slip of the screw 300 whereby the latter will not accelerate the water any more. In reality the above described following up the given value of angular acceleration $$\frac{d^2\theta}{dt^2}$$

on the part of the velocity of the transfer $$\left(\frac{dw}{dt}\right)$$

will be made more accurate and without any appreciable overreaching or overshooting owing to the anticipatory control of the field 123 of the phase advancing generator 250. This is responsive through the instrumentality of the tubes 138, 139 to the third time derivative $$\frac{d^3\theta}{dt^3}$$

of rolling (curve d) whereby all the actions above referred to are slightly advanced so as to permit a continuous adjustment of the rate of transfer $$\frac{dw}{dt}$$

of water to be substantially in phase with the angular acceleration (Equations (2) and (3)) to be continuously fulfilled.

During the time interval II—III the velocity of the flow of the liquid to starboard gradually increases and is maximum at the instant III when the ship is at the extreme starboard swing and when its angular velocity is zero. The gradually increasing acceleration of water to starboard during the time interval I—III, as is apparent, is mainly attributable to the external source of power (motor driving the oil pump 314), which through the instrumentality of a suitably controlled slip of the screw 300 is impressed upon the water in the cross channel accelerating it to starboard. For this reason considerable displacements of the water ballast necessary for an efficient stabilization can be produced for appreciably smaller angles of rolling (i. e. for small values of potential heads available) than those greater angles which must necessarily occur if the passive method is to function. For the sake of a qualitative comparison the corresponding position of the vessel in this latter case is shown in dotted lines.

Similar analysis can be applied to the time interval III—V when the angular acceleration to port decreases and when, consequently, the slip of the impeller 300 from positive will become negative, which will cause the deceleration of the moving fluid. During this period a partial regeneration of energy will take place and the external source of power will absorb less energy since a part of the energy will be restored from the loss of momentum of the decelerating water obtained through the instrumentality of the negative slip of the impeller 300 controlled in response to the decreasing acceleration to port.

The starting or stopping of the operation of the stabilizing system can be accomplished in any manner in which the coupling coefficient $a$ appearing in Equations (2), (3) and (4) can be varied. This can be accomplished for example by changing the filament temperature, and hence the thermionic emission of vacuum tubes, by shunting or by-passing various field windings, such as, 122, 123 (Figs. 7 and 9), controlling the excitation of generator 115, by changing the speed of the motor generator set by changing the resistance 149 in series with the coils 81, 82 of magnets shown on Fig. 7, whereby the amount of modulation by the coils 77, 78 is changed, or by any other well known either electrical or mechanical means, by which the operative association designated for the sake of abbreviation as coupling coefficient "$a$", between the displacement $w$, rate of displacement $$\frac{dw}{dt}$$

and acceleration of displacement $$\frac{d^2w}{dt^2}$$

of the liquid ballast on one hand, and angular velocity $$\frac{d\theta}{dt}$$

angular acceleration $$\frac{d^2\theta}{dt^2}$$

and the rate of angular acceleration $$\frac{d^3\theta}{dt^3}$$

of rolling on the other hand, can be varied. For example, at starting the coupling coefficient $a$ will be slowly increased from a substantially negligible value by gradually decreasing the resistance of the rheostat 149. The water ballast will start moving between the tanks with gradually increasing average velocities per cycle (with decrease of resistance) whereby more and more differential excess water $w$ will be introduced into the process of stabilization and the rolling of the ship will be gradually reduced until a steady state condition will be reached, corresponding to the maximum value of the coupling coefficient $a$ at which full amounts of the transferred water will be rushed back and forth between the tanks for a substantially reduced residual amplitude of rolling necessary to actuate the controlling instruments at the limit of their sensitivity. It is apparent that by reversing the above mentioned operations the ballast can be gradually brought to rest and the ship then will be allowed to roll freely among the waves as when no stabilization other than that afforded by the passive tank system is provided.

When the maximum effective wave slope $\phi$ of the sea is too great and the full amount $w$ of transferred water is unable to counteract its action, only a partial roll quenching occurs. In this case the ballast is rapidly transferred at the maximum capacity of the actuating power plant filling up the rising tank completely and this condition will continue for a certain time interval while the tank is still rising after which the power plant will develop again its full capacity in accelerating the water down hill. The performance in this case can be designated as performance outside of the roll quenching range, and simply marks an increase in the normally minute residual roll quenching range for which the equipment is designed. The basic relations (2), (3) and (4) apply in this case only to the time intervals when the flow in the channel 4 takes place, but do not apply to the time intervals during which the rising tank is completely filled. It is apparent that such somewhat discontinuous performance can be converted easily into a continuous one of the character described if the coupling coefficient $a$ is sufficiently decreased, so that even on such a heavy sea the continuity of operation of the water ballast is substantially secured without however the same degree of accuracy of stabilization as when the same equipment functions within its roll quenching range.

It is thus possible to adjust the value of coupling coefficient to suit the conditions of the sea. I prefer, however, to provide an additional automatic protective means serving to protect the tanks against violent blows of water ballast on extremely heavy seas, and supplementing the normal protecting devices, such as surge tanks and the like (not shown), and effective in the event of failure of such normal protective devices, should, by chance, the above mentioned recommendable reduction of the coupling coefficient be neglected.

By way of an example among a great variety of different interlocking circuits obvious to those skilled in the art from the preceding description Fig. 16 indicates one such protective arrangement of a pair of similar devices respectively associated with each tank.

Referring to Fig. 16, 500 designates a hollow float of an elongated cylindrical form suitably guided for a definite preferably vertical displacement with respect to a tank, such as port tank 2. The float is normally constrained downwards by means of a spring 501, secured to a bracket 502 situated on the top of the tank. The spring 501 presses against the shoulder or abutment 503 fastened to or formed on the rod 504 fixed to the float and extending upward substantially as shown.

On the upper part the rod 504 has a contact 505 shunting a fixed resistor 506 inserted in series with the rheostat 149 shown on Fig. 7, by means of which the coupling coefficient $a$ can be varied.

A second contact 507 connected in parallel with the contact 505 across the same resistor 506 is held in a closed condition by means of a spring 508. It may be opened by a relay 509 having differential winding and inserted in series with the plate circuits of the power tubes or valves 130, 131 shown on Fig. 7, and responsive to the angular acceleration of the ship. The relay 509 is energized therefore each time when the differential field 122 of generator 115 is energized and to a substantially proportional extent and from the preceding description it follows that this energization occurs in proportion to the angular acceleration of the vessel, I prefer to use an ordinary non-polarized relay which therefore opens the contact 507 each time the angular acceleration reaches a certain value corresponding to the setting of the spring 508 of the relay, irrespective of the fact that the acceleration is to port or to starboard.

For a normal setting of the spring 508 the contact 507 is open when the angular acceleration is in the vicinity of maximum value, that is around the points of maximum residual angle of rolling when the angular velocity of rolling is substantially zero and the levels of water in the tanks are at substantially equal height relative to the ship, as is shown on Fig. 15 instant III. For this particular position the float is not acted upon by the full level of water and the contact 505 is closed. A quarter of the period later when the ship passes instantaneously even keel position (instant V on Fig. 15) and when consequently angular acceleration is in the vicinity of zero, the plate currents of the tubes 130, 131 are equal and the solenoid 509 is not energized (at least as regards its set position), the contact 507 therefore remains closed. But at this instant the other contact 505 is open in view of the fact that the angular velocity of rolling being in the vicinity of maximum at this instant the tank is practically full and the force of buoyancy pushing the float 500 upwards is maximum and overcomes the downward push of the spring 501. At least one contact is always closed in the normal adjustment of the system for performance within the roll quenching range. It is thus apparent that when one contact is closed the other may be open or closed, but since the contacts are in parallel across the resistor 506 the later is shunted at all times either by one or by the other or both contacts 505 and 507. This or a similar predetermined condition can be obtained in any desired manner for a given normal operation by the proper adjustment of the springs 501, 508 when the equipment functions within its roll quenching range.

If the sea now becomes heavier than the limit of roll quenching for which the equipment is designed and if the power capacity of the ballast actuating plant is high enough, responsive to excessive acceleration of rolling, the water ballast may be rushed down hill (phase of motion corresponding to time interval I—III on Fig. 15) too fast and the water might reach almost the top of the tank considerably in advance of its eventual rise on opposite swing of the vessel which should happen only at instant V, Fig. 15. Under these conditions both contacts may be open simultaneously during a certain time interval, which is longer as the violence of roll is increased, and the resistor 506, not being shunted by either one of the contacts, will be introduced in series with coils 81 and 82, Fig. 7, whereby the intensity of the stabilizing control that is the coupling co-efficient $a$ appearing in Equations (2), (3) and (4) will be suddenly decreased. In this manner the stabilizing equipment during the periods of particularly heavy disturbances will automatically limit the intensity of its own control to the value at which the ballast will reach the top of the tank without any appreciable acceleration which obviates the possibility of violent blows of water against the top of the tank.

It may be noted that, although in certain respects quite analogous, the noted copending application generally has reference to a stabilizing system in which the moving weight is of fixed mass while the lever arm is of variable length, whereas in the instant invention the weight is variable, but effective on fixed lever arms.

Furthermore in case of a solid weight the control is essentially more positive which permits the follow up circuits and apparatus conveniently to be associated with the actual displacements of the weight. In case of liquid weight, the control being not quite as positive as in the case of solid weight, it appears preferable to associate these follow up circuits and apparatus with the rate of displacement proper in order to compensate in this manner a comparatively smaller degree of positiveness and somewhat greater time lags resulting from this fact. In addition to this in case of the liquids the rate of flow responsive methods and means are more commonly used than the speed responsive devices to be used in conjunction with the reversably moving weight.

From the standpoint of the control proper it is immaterial whether the magnitude of the stabilizing moment (i. e. lever arm of the weight in case of solid moving weight system, excess water instantaneously concentrated in one tank in case of the liquid weight installation) is controlled directly by an angular velocity responsive instrument shown in my copending application or the rate of change of this moment (i. e. instantaneous speed of the solid weight on its track for solid weight system and the rate of flow of the liquid) is controlled by an angular acceleration responsive instrument such as accelerometer 51 shown on Figs. 1 and 3 of this invention.

According to this broad dynamical interpretation of this invention a substantially similar controlling action can be obtained by an operative association of angular velocity of rolling responsive instrument such as a constrained gyroscope suitably positioned with a follow up circuit continuously actuated by floats similar to those shown on Fig. 16 for a protective control. The nature of this operative association could be established in accordance with the same principle as disclosed in this invention, namely, the constrained gyro (instead of the accelerometer 51 (Fig. 3) is operatively associated with the coils 77, 78 and the remaining parts of the control of the fields 122, 123 shown on Fig. 7 and the floats responsive to the instantaneous amounts of water in the tanks (instead of the stream line body 92 shown on Fig. 4 of this invention) are associated in any suitable manner with the follow up field 124 of Fig. 7.

Many other modifications of the disclosed invention are possible without any departure from the spirit and scope of the appended claims. For instance instead of having one central blower and connecting its output and suction to the tanks as was explained, clearly two independent blowers located each on the top of any well known method, such as, for example, is shown on Fig. 11, as synchronous angle transmitting drive 321, 322 could equally well be used with the corresponding advantage of elemination of the cross pipes 7, 8, 10, 11 shown on Fig. 2. In a similar manner in case of a reversible hydraulic transmission shown on Fig. 11 any other form of hydraulic transmission well known in the art could be employed; for example, the motor driving the screw 300 could be made to run continuously at a constant speed and the accelerations and decelerations of the water ballast could be produced by suitable rotation of the blades from the control mechanism as is used frequently in hydraulic installations. Obviously there will be as many cross channels 4 and of such size, and as many impellers 300 as necessary for the volume to be transferred.

On the electrical side the possible combinations are still more numerous; thus for instance instead of combining controlling actions responsive to angular acceleration, rate of acceleration, follow up field, etc., as ampere turns acting on the same magnetic circuit this combination could be produced mechanically by means of differential gears or similar devices as shown in my copending application, Ser. No. 544,651; furthermore thermionic devices could be eliminated if so desired and equivalent rheostat or potentiometer circuits substantially as shown on Fig. 11 for the follow up field 321 control could be used throughout the whole electrical wiring diagram.

Finally on the hydraulic end of the problem instead of the stream line body 92 with the associated velocity of flow follow up devices, any other known apparatus responsive to the so called velocity head, such as Pitot tube for example, can be equally well utilized with an appropriate functional transformation to transform from a substantially quadratic into a linear scale.

The basic relations (2), (3) and (4) laid down as a foundation for this invention in themselves must be considered rather as illustrative and not in the limiting sense, since the operativeness of the stabilizing system is not limited strictly to the proportional or linear functional relations exemplified by Equations (2), (3) and (4) but is applicable to more general functional relations which satisfy, however, the Froude's conditions of damping as seen from Equation (1).

I claim:

1. In an anti-rolling stabilizing tank system, a ship, tanks arranged athwartships for liquid ballast, a connecting channel, instruments responsive to higher time derivatives of angular motion of rolling, electrical circuits operatively associated with said instruments, a power plant arranged for actuation of transverse displacements of ballast relative to said tanks and controlled by said circuits, so as to produce said displacements in a predetermined functional relation to said higher time derivatives of rolling motion whereby the optimum roll quenching conditions are continuously maintained.

2. In an anti-rolling stabilizing system, a ship, tanks arranged on both sides of said ship, a cross channel connecting said tanks, said tanks being partially filled with liquid, a power plant arranged for producing displacements of said liquid between tanks, instruments continuously responsive to angular acceleration of rolling, circuits operatively associated with said instruments and continuously responsive to angular acceleration and to the rate of angular acceleration of rolling and controlling said plant so as to produce the displacements of said liquid in a predetermined functional relation to said acceleration and said rate of acceleration of rolling.

3. In an anti-rolling stabilizing tank system, a ship, tanks arranged on both sides of said ship, a cross channel connecting said tanks, liquid ballast partially filling said tank system, an angular acceleration responsive instrument, electrical circuits and apparatus operatively associated with said instrument, a power plant arranged for producing displacements of said ballast in said system and controlled by said circuits and apparatus so as to produce the rate of displacement of said ballast in a predetermined functional relation to the angular acceleration of rolling.

4. In an anti-rolling stabilizing tank system, a ship, tanks arranged on both sides of said ship, a cross channel connecting said tanks, liquid ballast filling totally said channel and partially said tanks, an angular acceleration responsive instrument, electrical circuits and apparatus operatively associated with said instruments, a power plant actuating displacements of said ballast in said system and controlled by said circuits and apparatus so as to produce the rate of displacement of said ballast through said channel substantially in proportion to the instantaneous value of angular acceleration whereby the concentration of said ballast on the rising side of said ship is continuously maintained substantially in proportion to the instantaneous value of angular velocity of rolling whereby the optimum conditions of roll quenching are continuously obtained.

5. In an anti-rolling stabilizing tank system, a ship, tanks arranged on both sides of said ship, water ballast partially filling said tanks, an angular acceleration responsive instrument, circuits and apparatus operatively associated with said instrument, a power plant arranged to produce opposite variation of level in said tanks and controlled by said circuits and apparatus so as to vary the water levels in said tanks in opposite directions at a rate substantially proportional to angular acceleration of rolling of the ship whereby the concentration of said ballast on the rising side of said ship is continuously maintained substantially in proportion to the instantaneous angular velocity of rolling.

6. In an anti-rolling stabilizing tank system, a ship, tanks arranged on both sides of said ship for water ballast, an angular acceleration responsive instrument, circuits and apparatus operatively associated with said instrument, a power plant arranged for producing changes of quantities of said ballast in said tanks in opposite directions and controlled by said instruments and circuits so that the rate of variation of said changes is substantially proportional to the angular acceleration of the ship whereby optimum stabilizing efficiency of said tank system is produced, and means operatively associated with said circuits and apparatus for varying the proportionality factor between said acceleration and said rate whereby the intensity of the stabilizing control can be varied.

7. In an anti-rolling stabilizing tank system, a ship, tanks arranged on both sides of said ship for water ballast, an angular acceleration responsive instrument, circuits and an angular acceleration responsive instrument, circuits and apparatus operatively associated with said instrument, a power plant arranged for producing changes in quantity of said ballast in said tanks in opposite directions at a rate substantially proportional to angular acceleration of rolling of said ship and automatic protecting means simultaneously responsive to said acceleration and to the instantaneous amount of water in the tanks for reducing the intensity of actuation of said plant when the disturbing moment of the sea becomes excessive.

8. In an anti-rolling stabilizing tank system, a ship, tanks arranged on both sides of said ship for liquid ballast, an angular acceleration responsive instrument, controlling circuits and apparatus operatively associated with said instrument, a power plant adapted for producing a differential variation of the quantity of liquid ballast contained in said tanks, instruments and circuits operatively associated with and responsive to said differential variation of said ballast and arranged in a follow up neutralizing relation with the first mentioned controlling instruments and circuits, and means responsive to the resultant action of said controlling and said neutralizing instruments and circuits and controlling said plant so as to effect said differential variation of ballast in said tanks at a rate substantially proportional to angular acceleration of rolling of the ship, whereby the concentration of the ballast on the rising side of said ship in proportion to instantaneous angular velocity is continuously produced.

9. In an anti-rolling stabilizing tank system, a ship, tanks arranged on both sides of said ship, a connecting channel water ballast filling partially said tanks and totally said channel, instruments responsive to angular motion of rolling, impeller means arranged operatively relative to the ballast in the channel, a power plant driving said impeller, means operatively associated with said instruments for varying the slip of said impeller with respect to said ballast whereby accelerations of the ballast are controlled in response to said motion of rolling.

10. In an anti-rolling stabilizing tank system, a ship, tanks arranged on both sides of said ship, a connecting channel, water ballast filling partially said tanks and totally said channel, an instrument responsive to angular acceleration of rolling, circuits and apparatus operatively associated with said instrument, impeller means arranged operatively relative to the ballast in the channel, a power plant driving said impeller, means for varying the slip of said impeller with respect to said ballast and controlled by said circuit and apparatus so as to maintain through the instrumentality of momentum transmitted to the ballast from said impeller, a rate of flow of said ballast in a predetermined functional relation with respect to said angular acceleration of rolling.

11. In an anti-rolling stabilizing tank system, a ship, tanks arranged on both sides of said ship, a connecting channel water ballast filling partially said tanks and totally said channel, an instrument responsive to angular acceleration of rolling, circuit means responsive to the rate of said acceleration circuits and apparatus operatively associated with said instrument and said first mentioned circuit, impeller means arranged operatively relative to the ballast in said channel, a source of power to drive said impeller means, means for varying the slip of said impeller means with respect to said ballast and controlled by said circuits and apparatus so as to produce an acceleration of said ballast substantially in proportion to the rate of acceleration of rolling and a rate of flow of said ballast substantially in proportion to said acceleration whereby the concentration of the ballast on the rising side of the vessel is continuously maintained substantially in proportion to angular velocity of rolling to secure optimum roll quenching efficiency of said tank system.

12. In an anti-rolling stabilizing tank system, a ship, tanks arranged on both sides of said ship, connecting channel, water ballast filling partially said tanks and totally said channel, reversible impeller means arranged operatively relative to the ballast in said channel, a source of power to drive said impeller, means for varying the slip of said impeller with respect to said ballast, instruments responsive to angular acceleration of rolling and to the rate of said acceleration, circuits responsive to said instruments, means responsive to the rate of flow of said ballast through said channel follow up circuits responsive to said last mentioned means and neutralizing the action of the first mentioned circuits at a predetermined value of the rate of flow substantially proportional to the instantaneous value of angular acceleration of rolling whereby the concentration of said ballast on the rising side of the vessel is continuously maintained substantially in proportion to the angular velocity of rolling.

13. In ships having tanks and a transverse channel, propulsive means for causing flow through the channel between the tanks, an angular acceleration responsive instrument, and means operatively associating the propulsive means and the instrument and controlling the propulsive means as a function of angular acceleration of rolling.

14. Anti-rolling ship stabilizing means arranged for operative association with liquid ballast tanks of a ship, comprising an instrument responsive to the angular acceleration of rolling of the ship, actuatable means for concentrating liquid ballast in such tanks on the rising side of the ship, said actuatable means operatively associated with the instrument so as to deconcentrate the liquid ballast in such tank on the descending side of such ship as a function of angular velocity.

15. Anti-rolling ship stabilizing means arranged for operative association with a ship having port and starboard tanks, comprising an instrument responsive to the angular acceleration of rolling of the ship, actuatable means operatively associated with the instrument and with the tanks for simultaneously concentrating liquid ballast on the rising side of the ship and deconcentrating liquid ballast on the descending side of the ship the rate of concentration and deconcentration as a function of angular acceleration of rolling of the ship.

16. In combination, a ship, port and starboard tanks, a transverse channel communicating with the tanks, propulsive means for securing liquid flow through the channel between the tanks, an instrument responsive to the angular acceleration of rolling of the ship, and means operatively associating the instrument and the propulsive means to secure a rate of flow responsive to a function of the angular acceleration of rolling.

17. In an anti-rolling stabilizing tank system, a ship, tanks arranged for liquid ballast on both sides of said ship, a connecting channel for the tanks, instruments responsive to angular acceleration of rolling, a power plant arranged for displacements of said ballast between said tanks through said channel, means establishing an operative association between said instruments and said plant so as to produce the rate of said displacement in a predetermined functional relation with respect to said angular acceleration whereby the timing of stabilizing moment produced by said ballast remains at all times in a predetermined functional relation with respect to angular velocity both for regular and erratic rolling, whereby the optimum condition of roll quenching is continuously maintained.

18. In an anti-rolling stabilizing tank system, a ship, tanks arranged for liquid ballast on both sides of said ship, a connecting channel for the tanks, instruments responsive to angular acceleration of rolling, instruments responsive to the rate of angular acceleration of rolling, a power plant arranged for displacements of said ballast between said tanks through said channel, means establishing an operative association between said instruments and said plant so as to produce the time rate of said displacement in a predetermined functional relation with respect to angular acceleration and to produce the time rate of variation of said first mentioned rate in a predetermined functional relation with respect to the rate of angular acceleration whereby the timing of stabilizing moment produced by said ballast remains continuously in a predetermined functional relation with respect to angular velocity with a corresponding elimination of effects of time lags in the transmission system whereby the optimum condition of roll quenching is continuously maintained both for regular and irregular rolling.

19. In an anti-rolling stabilizing tank system, a ship, tanks arranged for liquid ballast on both sides of said ship, a connecting channel for the tanks, instruments responsive to angular acceleration of rolling and to the plurality of higher time derivatives of said acceleration, a power plant arranged for displacement of said ballast between said tanks through said channel, means establishing an operative association between said instruments and said plant arranged to produce a predetermined functional relation between the subsequent time rates of higher orders in said displacements of ballast and corresponding time rates of higher orders of said acceleration whereby a close correspondence between the stabilizing moment of said ballast and the disturbing moment of the sea producing said acceleration and said higher rates thereof is continuously secured with a corresponding elimination of time lags in transmissions both for regular trochoidal and irregular erratic rolling.

20. In an anti-rolling stabilizing tank system, a ship, a tank system arranged for liquid ballast on both sides of said ship, a connecting channel for the tanks, instruments responsive to the rate of flow of said ballast through said channel, a power plant arranged for displacements of said ballast between said tanks, propelling means actuated by said plant and displacing said ballast through said channel, differential means establishing an operative association between first mentioned instruments and the second mentioned instruments and controlling said plant so as to maintain continuously the rate of flow of the ballast in a predetermined functional relation with respect to said motion corresponding to the departures from a substantially zero point of control of said differential means whereby the stabilizing moment of said tank system is continuously maintained in a predetermined functional relation with respect to said angular motion both for regular and irregular rolling.

21. In an anti-rolling stabilizing tank system, a ship, a tank system arranged for liquid ballast on both sides of said ship, a connecting channel for the tanks, an angular acceleration responsive instrument, continuously acting electrical circuits and apparatus operatively associated with said instrument, a power plant, an impeller means arranged for imparting a momentum on said ballast in said channel and actuated by said plant, means responsive to the velocity of flow of said ballast through said channel, electrical circuits and apparatus operatively associated with said velocity of flow responsive means, differential means combining the actions of the first and of the second mentioned circuits and apparatus into a resultant action maintaining the state of actuation of said ballast by said impeller substantially at the zero point of said differential means whereby the rate of flow of the ballast in the channel is maintained substantially in proportion to the instantaneous value of angular acceleration of rolling corresponding to the instantaneous value of stabilizing moment produced by said ballast being in phase with the instantaneous angular velocity of rolling both for regular and irregular rolling.

22. In an anti-rolling tank system, a ship, a tank system arranged for liquid ballast athwartship, a connecting channel between the tanks, angular motion responsive instruments, level responsive instruments, velocity of flow responsive instruments, differential means combining responses of said angular motion instruments on one hand and said level and flow responsive instruments relative to the tank system on the other hand, a power plant, propelling means arranged for displacing said ballast in said channel and actuated by said plant, continuously acting circuits and apparatus operatively associated with said differential means and controlling said plant so as to establish a combined follow-up action between angular velocity of rolling and amount of concentration of said ballast on one hand and the rate of concentration of said ballast and angular acceleration of rolling on the other hand, whereby a close following up of the disturbing wave moment by stabilizing moment is continuously maintained both for regular and irregular rolling.

23. In an anti-rolling stabilizing tank system, a ship, tanks arranged for liquid ballast on both sides of said ship, a connecting channel for the tanks, instruments responsive to angular motion of rolling of said ship, a space discharge thermionic system operatively associated with said instruments, a power plant, a propelling means arranged for actuation of said ballast in said channel, instruments responsive to the magnitude and subsequent higher time rates of variation of the moment exerted by said tank system on said ship, a second space discharge thermionic system operatively associated with said instruments, an electromagnetic apparatus controlled by the resultant differential action of the first and of the second mentioned thermionic systems and maintaining the actuation of said propelling means at a rate corresponding to a substantially zero point of said differential action whereby a close follow-up action is produced and a desired predetermined functional relation between the angular motion of the ship and displacement of the ballast is continuously maintained.

24. In an anti-rolling stabilizing tank system, a ship, tanks arranged for liquid ballast on both sides of said ship, a connecting channel for the tanks, instruments responsive to angular motion of rolling of said ship, electrical circuits operatively associated with said instruments, instruments responsive to the distribution of said ballast between said tanks, electrical circuits operatively associated with said instruments, means combining the actions of the first and the second mentioned circuits, a means for varying the relative values of actions in the first and the second mentioned circuits, a power plant, a propelling means arranged for actuation of said ballast in said channel, and means for controlling said plant by the resultant action of the first and the second mentioned circuits, whereby a close follow-up action of the stabilizing system is produced and the adjustability between the primary control corresponding to said first mentioned circuit and the secondary control corresponding to said second mentioned circuit is secured whereby an aperiodic behavior of the tank system is attained.

25. In an anti-rolling stabilizing tank system, a ship, tanks arranged on both sides of said ship, means for varying the levels of water ballasts in said tanks in opposite directions, a power plant arranged to actuate said water level variations, angular acceleration responsive means, electrical circuits operatively associated with said acceleration responsive means, means responsive to the difference of water levels in said tanks and to the plurality of higher time derivatives of its variation, electrical circuits operatively associated with said difference of water levels and its time derivatives responsive means, means for differentially combining the actions of the first and of the second mentioned circuits into a resultant action controlling said plant so as to control said plant controlling said resultant action whereby by departures of said resultant action whereby time rate variations of said water levels in said tanks are continuously maintained in a predetermined functional relation to angular acceleration and the level difference by this fact is continuously maintained in a correspondingly predetermined functional relation to angular velocity of rolling whereby the optimum conditions of roll quenching are continuously maintained both for regular substantially trochoidal and for irregular erratic rolling.

26. In an anti-rolling stabilizing tank system, a ship, tanks arranged on both sides of said ship for liquid ballast, a connecting channel for the tanks, a power plant, propelling means in said channel actuated by said plant and capable of displacing said ballast between said tanks, instruments responsive to angular motion of said ship, instruments responsive to displacements of ballast in said tank system, a continuously acting space discharge system operatively associated with the first mentioned instruments, and with said second mentioned instruments and with said plant and controlling the latter so as to establish a predetermined functional relation between the displacements of said ballast by said propelling means and angular motion of said ship whereby the optimum conditions of roll quenching are maintained by continuity both for regular, substantially trochoidal and for irregular erratic rolling.

27. In an anti-rolling stabilizing tank system, a ship, tanks arranged on both sides of said ship for liquid ballast, a connecting channel for the tanks, a power plant, means for displacing said ballast from said plant, instruments responsive to angular motion of rolling of said ship, a continuously acting electrical circuit operatively associated with said instruments, instruments responsive to motion and position of ballast in said tank system, a continuously acting electrical circuit operatively associated with said last mentioned instruments, an electromagnetic mechanism controlled by resultant differential action of said circuits and controlling said plant so as to maintain a predetermined functional relation between said angular motion of the ship and said motion of the ballast whereby the effect of ballast on the ship appears as a fixed parameter of damping for said ship, and the maximum stabilizing efficiency is continously maintained for all conditions of rolling.

28. In an anti-rolling stabilizing tank system, a ship, tanks arranged for liquid ballast on both sides of said ship, a connecting channel for the tanks, instruments responsive to angular acceleration of rolling, a power plant arranged for displacements of said ballast between said tanks through said channel, means establishing an operative association by continuity between said instruments and said plant so as to produce the displacement of said ballast in response to angular acceleration of the ship, means responsive to the velocity of flow of said ballast through said channel, means establishing an operative association by continuity between said instruments and said plant so as to reduce continuously the action of the first association producing means in response to the velocity of flow of said ballast through said channel whereby said rate of flow is continuously maintained in proportion to the instantaneous value of angular acceleration of rolling and whereby the maximum roll quenching efficiency is continuously maintained both for regular and for erratic rolling.

29. In an anti-rolling stabilizing tank system, a ship, tanks arranged for liquid ballast on both sides of said ship, a connecting channel for the tanks, instruments responsive to angular acceleration of rolling, a power plant arranged for displacements of said ballast between said tanks through said channel, means establishing an operative association between said instruments and said plant so as to produce the rate of said displacement in a predetermined functional relation with respect to angular acceleration, and means responsive to the excess of angular motion above a fixed predetermined value to limit the intensity of operative association of said association establishing means whereby the maximum roll quenching efficiency is continuous'y maintained both for regular and for erratic rolling without any undue strain on said tank system.

30. In a system for anti-rolling stabilization of ships and the like, a torque producing means, a power plant to actuate said means, instruments responsive to angular acceleration of rolling, instruments responsive to the rate of variation of the torque produced by said first mentioned means, means for producing a differential combination of responses of said first mentioned and of said second mentioned instruments and controlling said plant in response to said differential combination so as to produce continuously a rate of variation of said torque in a predetermined functional relation with respect to angular acceleration of rolling whereby the optimum roll quenching efficiency is continuously maintained both for regular and for erratic rolling.

31. In a system for anti-rolling stabilization of ships and the like, a torque producing means, a power plant to actuate said means, instruments responsive to angular acceleration of rolling, instruments responsive to the rate of variation of the torque produced by said first mentioned means, means for producing a differential combination of responses of said first mentioned and of said second mentioned instruments, a circuit means responsive to the rate of response of the first mentioned instrument and operatively associated with said differential combination producing means so as to control said power plant by a joint action of said differential combination producing means and said circuit means so as to produce continuously a rate of variation of said torque in a predetermined functional relation with respect to angular acceleration of rolling with a corresponding reduction of time lags whereby the optimum roll quenching efficiency is continuously maintained both for regular and for erratic rolling.

32. In an anti-rolling stabilizing tank system, a ship, tanks arranged for liquid ballast on both sides of said ship, a connecting channel, instruments responsive to angular motion of rolling, instruments responsive to the motion of said ballast, a power plant arranged for actuation of athwartship displacements of said ballast between said tanks, means for producing a differential combination of responses of said first mentioned and second mentioned instruments and controlling said plant in response to said differential combination so as to produce continuously a rate of transfer of said ballast in a predetermined functional relation with respect to angular acceleration of rolling whereby the optimum roll quenching efficiency is continuously maintained.

33. In an anti-rolling stabilizing tank system, a ship, tanks arranged for liquid ballast on both sides of said ship, a connecting channel, instruments responsive to angular acceleration of rolling, instruments responsive to the rate of transfer of the ballast between the tanks, a power plant arranged for actuation of athwartship displacements of said ballast between said tanks, means for producing a differential combination of responses of said first mentioned and of said second mentioned instruments and controlling said plant in response to said differential combination so as to produce continuously a rate of transfer of said ballast in a predetermined functional relation with respect to angular acceleration of rolling whereby the optimum roll quenching efficiency is continuously maintained.

34. In an anti-rolling stabilizing tank system, a ship, tanks arranged for liquid bal'ast on both sides of said ship, a connecting channel, an instrument responsive to angular acceleration of rolling, an instrument responsive to the rate of angular acceleration of rolling, a device responsive to the rate of transfer of the ballast between said tanks, a power plant arranged for actuation of athwartship displacements of said ballast between said tanks, means combining responses of said instruments, differential means arranging in opposition responses of said device and said combining means and controlling said plant so as to produce the rate of variation of the stabilizing torque produced by said ballast in said tanks and applied to said ship substantially in proportion to the angular acceleration of rolling with time lags in transmission being substantially reduced by said instrument responsive to the rate of angular acceleration.

35. In an anti-rolling stabilizing tank system, a ship, tanks arranged for liquid ballast on both sides of said ship, a connecting channel, an instrument reponsive to angular acceleration of rolling, electrical circuits and apparatus operatively associated with said instrument, an instrument responsive to the rate of transfer of ballast between the tanks, electrical circuits and apparatus operatively associated with said instrument, a power plant arranged for actuation of athwartship displacements of said ballast between said tanks, means arranged for a differential combination of both said circuits and apparatus and controlling said plant so as to produce the rate of transfer of said ballast between said tanks substantially in phase with and in proportion to the angular acceleration of rolling whereby the excess amount of water in the tanks is varied so as to be at all times in phase with and in proportion to the angular velocity of rolling.

36. In an anti-rolling stabilizing tank system, a ship, tanks arranged for liquid ballast on both sides of said ship, a connecting channel, a primary controlling system operatively associated with an accelerometer, a secondary controlling system operatively associated with an instrument responsive to the rate of transfer of the ballast, a power plant arranged for actuation of athwartship displacements of said ballast between said tanks, differential means combining responses of said primary and said secondary system and controlling said power plant so as to maintain the rate of flow of said ballast at any instant in phase with and in proportion to the angular acceleration of rolling whereby the optimum condition of roll quenching is continuously fulfilled both for regular and for irregular disturbing moments of the sea.

37. In an anti-rolling stabilizing system of gravity type, a ship, tanks arranged for liquid ballast on both sides of said ship, a power plant arranged for variation of the amount of ballast in said tanks in opposite directions, means responsive to angular acceleration of rolling, means operatively associated with said first mentioned means and controlling said plant so as to produce the rate of opposite variation of levels in said tanks in a predetermined functional relation with respect to angular acceleration of rolling whereby the optimum conditions of roll quenching are continuously fulfilled both for regular and for erratic disturbing moments of the sea.

38. In an anti-rolling stabilizing tank system, a ship, tanks arranged for liquid ballast on both sides of said ship, a connecting channel, an angular acceleration responsive instrument, flat coils operatively associated with said instrument and capable of being displaced in the air-gap of an A. C. electromagnet, a velocity of flow in the channel responsive instrument, means operatively associated with said velocity responsive instrument and displacing said magnet with respect to said coils, a power plant arranged for producing displacements of said ballast between said tanks, a continuously acting electrical system operatively associated for control from the amplitude of the electromotive force induced in said coil by said electromagnet and controlling said plant so as to produce a follow-up relation between said angular acceleration of rolling and said velocity of flow whereby the optimum conditions of roll quenching are continuously fulfilled both for regular, trochoidal as well as for irregular erratic rolling.

39. In an anti-rolling stabilizing tank system, a ship, tanks arranged for liquid ballast on both sides of said ship, a connecting channel, a power plant arranged for producing displacements of said ballast between said tanks, a primary controlling system comprising an angular acceleration responsive instrument and coils operatively associated with said instrument, and arranged for motion in response to angular acceleration, a secondary controlling or follow-up system comprising a rate of flow responsive instrument and an A. C. electromagnet arranged for relative motion with respect to said coils, a continuously acting electrical system with a substantially electrostatic control controlled in response to amplitude variations of electromotive force induced by said electromagnet in said coils and controlling said plant so as to maintain continuously the rate of flow of said ballast in a predetermined functional relation with respect to angular acceleration whereby the optimum condition of roll quenching is continuously fulfilled both for regular trochoidal and irregular erratic rolling.

40. In an anti-rolling stabilizing tank system, a ship, tanks arranged for liquid ballast on both sides of said ship, a channel connecting said tanks, a power plant arranged for producing displacements of said ballast between said tanks, a primary controlling system comprising an angular acceleration responsive instrument and coils operatively associated with said instrument and arranged for motion in response to angular acceleration, a secondary follow-up system comprising a rate of flow responsive instrument and an electromagnet arranged for relative motion with respect to said coils, a continuously acting electrical system actuated in response to amplitude variations of electromotive force induced by said magnet in said coils and controlling said plant so as to maintain continuously the rate of flow of said ballast in a predetermined functional relation with respect to angular acceleration whereby the optimum conditions of roll quenching are continuously maintained, and means for varying the roll quenching range of stabilizer by a means producing a variation in the induced electromotive force for a predetermined relative position of said coil and said electromagnet.

NICOLAI MINORSKY.